US012560135B2

(12) United States Patent
Gajiwala et al.

(10) Patent No.: US 12,560,135 B2
(45) Date of Patent: Feb. 24, 2026

(54) PRECURSOR COMPOSITIONS FOR AN INSULATION AND RELATED METHODS

(71) Applicant: Northrop Grumman Systems Corporation, Falls Church, VA (US)

(72) Inventors: Himansu M. Gajiwala, Layton, UT (US); Steven B. Hall, Perry, UT (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 166 days.

(21) Appl. No.: 18/064,703

(22) Filed: Dec. 12, 2022

(65) Prior Publication Data

US 2023/0287848 A1 Sep. 14, 2023

Related U.S. Application Data

(63) Continuation of application No. 15/793,862, filed on Oct. 25, 2017, now abandoned.

(51) Int. Cl.
| | |
|---|---|
| *F02K 9/34* | (2006.01) |
| *C08K 3/04* | (2006.01) |
| *C08L 9/00* | (2006.01) |
| *C08L 23/0807* | (2025.01) |
| *C08L 23/14* | (2006.01) |
| *C08L 23/16* | (2006.01) |
| *C08L 77/10* | (2006.01) |

(52) U.S. Cl.
CPC ............... *F02K 9/346* (2013.01); *C08K 3/04* (2013.01); *C08L 9/00* (2013.01); *C08L 23/083* (2013.01); *C08L 23/145* (2013.01); *C08L 23/16* (2013.01); *C08L 77/10* (2013.01); *F02K 9/34* (2013.01)

(58) Field of Classification Search
CPC ... F02K 9/346; F02K 9/34; C08K 3/04; C08L 9/00; C08L 23/083; C08L 23/145; C08L 23/16; C08L 77/10; C08L 12/16; C08L 77/00
USPC ......................................................... 525/240
See application file for complete search history.

(56) References Cited

U.S. PATENT DOCUMENTS

| | | | |
|---|---|---|---|
| 2,303,329 | A | 12/1942 | Cyr |
| 4,878,431 | A | 11/1989 | Herring |
| 5,352,312 | A | 10/1994 | Guillot |
| 5,821,284 | A | 10/1998 | Graham et al. |
| 6,566,420 | B1 | 5/2003 | Guillot et al. |
| 6,606,852 | B1 | 8/2003 | Harvey et al. |
| 6,691,505 | B2 | 2/2004 | Harvey et al. |

(Continued)

FOREIGN PATENT DOCUMENTS

| | | |
|---|---|---|
| CN | 105754273 A | 7/2016 |
| CN | 107057196 A | 8/2017 |

(Continued)

OTHER PUBLICATIONS

Asbury Carbons "Expandable Graphite"; Accessed Oct. 17, 2017 at https://asbury.com/brochures-literature/brochures-2/; (2 pages); Asbury Carbon Anthracite Industries Division.

(Continued)

*Primary Examiner* — David T Karst
(74) *Attorney, Agent, or Firm* — TraskBritt

(57) ABSTRACT
A precursor composition comprising, before curing, ethylene propylene diene monomer (EPDM), an aramid, and a carbon material comprising carbon nanotubes, graphite, or a combination thereof. A rocket motor including a reaction product of the precursor composition and a method of insulating a rocket motor are also disclosed.

14 Claims, 9 Drawing Sheets

(56) References Cited

U.S. PATENT DOCUMENTS

| | | | |
|---|---|---|---|
| 6,953,823 | B2 | 10/2005 | Fan |
| 7,012,107 | B2 | 3/2006 | Harvey et al. |
| 7,070,705 | B2 | 7/2006 | Harvey et al. |
| 7,410,607 | B2 | 8/2008 | Guillot |
| 7,461,503 | B2 | 12/2008 | Gajiwala |
| 7,485,060 | B2 | 2/2009 | Hineno et al. |
| 7,767,746 | B2 | 8/2010 | Gajiwala |
| 10,612,492 | B2 | 4/2020 | Gajiwala et al. |
| 2002/0018847 | A1 | 2/2002 | Guillot |
| 2002/0189233 | A1 | 12/2002 | Harvey et al. |
| 2003/0181545 | A1 | 9/2003 | Barboric et al. |
| 2004/0106732 | A1 | 6/2004 | Tsuji et al. |
| 2007/0112091 | A1 | 5/2007 | Fan et al. |
| 2007/0112136 | A1 | 5/2007 | Nakano et al. |
| 2007/0270540 | A1 | 11/2007 | Kanae et al. |
| 2009/0137700 | A1 | 5/2009 | Gajiwala |
| 2010/0210770 | A1 | 8/2010 | Nadeau et al. |
| 2011/0086735 | A1 | 4/2011 | Takahashi et al. |
| 2011/0186775 | A1 | 8/2011 | Shah et al. |
| 2012/0021860 | A1 | 1/2012 | Matsuda |
| 2012/0153242 | A1 | 6/2012 | Le Bonte et al. |
| 2014/0011963 | A1 | 1/2014 | Mccauley et al. |
| 2014/0255635 | A1 | 9/2014 | Morgan et al. |
| 2015/0203668 | A1 | 7/2015 | Bedard et al. |
| 2018/0265686 | A1 | 9/2018 | Gajiwala et al. |
| 2018/0265692 | A1 | 9/2018 | Gajiwala et al. |
| 2019/0120174 | A1 | 4/2019 | Gajiwala et al. |

FOREIGN PATENT DOCUMENTS

| | | | |
|---|---|---|---|
| CN | 104875467 | B | 9/2017 |
| EP | 0116453 | A2 | 8/1984 |
| EP | 0569995 | A1 | 12/1998 |
| EP | 3045770 | A1 | 7/2016 |
| EP | 3184585 | A1 | 6/2017 |
| JP | 59-174340 | A | 10/1984 |
| JP | 2002-535812 | A | 10/2002 |
| JP | 2003-504474 | A | 2/2003 |
| JP | 2011-174004 | A | 9/2011 |
| WO | 01/04198 | A1 | 1/2001 |
| WO | 2014/168979 | A1 | 10/2014 |

OTHER PUBLICATIONS

Corrosionpedia, "Hydrocarbon Solvent", https://www.corrosionpedia.com/definition/2182/hydrocarbon-solvent#:~:text=Corrosionpedia%20explains%20Hydrocarbon%20Solvent&text=Frequently%20used%20aliphatic%20hydrocarbon%20solvents,heptanes%2C%20hexanes%20and%20mineral%20spirits.&text=The%20primary%20use%20for%20these,as%20grease%20and%20oil%20spills, Last Accessed Jan. 20, 2021, Last Updated Feb. 27, 2018, 2 pages.

Cray Valley USA, LLC, "Use of Polybutadiene Coagents in Peroxide Cured Elastomers for Wire and Cable Compounds", 01/10, 19 pages, Dec. 1, 1995.

DOW Technical Information, Nordel IP 4520 Hydrocarbon Rubber, 2 pages; Form No. 400-00084029en, Rev: Jan. 11, 2012.

Encyclopaedia Britannica "Paraffin hydrocarbon Chemical Compound" Article, 1 page; https://www.britannica.com/science/paraffin-hydrocarbon; accessed Nov. 14, 2019.

European Communication pursuant to Article 94(3) EPC for European Application No. 18200704.7, dated Jan. 12, 2022, 4 pages.

European Extended Search Report and Opinion for European Application No. 18200704.7, dated Mar. 19, 2019, 6 pages.

Graphistrength Advanced Materials, Graphistrength EPDM; CNT Masterbatch Technical Data Sheet (2 pages).

Lanxess Deutschland GmbH, "KELTAN 2650 Product Data Sheet" Issue No. LX10/Publication issued Sep. 24, 2013, 2 pages.

Lanxess Energizing Chemistry, Buna® EP, Ethylene Propylene Rubber, The Versatile Elastomer, Edition May 2007, Publication, May 2007, 24 pages.

Martin Marietta Magnesia Specialties, LLC "MagShield (Registered) S Standard Grade Magnesium Hydroxide for Flame Retardant Applications" Copyright (Copyright) 2015 by Martin Marietta Magnesia Specialties, LLC Version Jan. 28, 2015, 1 page.

Moore et al., "Reusable Solid Rocket Motor—Accomplishments, Lessons, and a Culture of Success" Article, NASA Marshall Space Flight Center; Huntsville, Alabama, (2011), 28 pages.

Nordel EPDM Product Selection Guide, Published Apr. 2014, (Copyright) 2014 The Dow Chemical Company, 8 pages.

OxyChem Dechlorane Plus Manual, CAS Registry No. 13560-89-9, 51 Pages; https://www.oxy.com/OurBusinesses/Chemicals/Products/Documents/dechloraneplus/dechlorane_plus.pdf; accessed Nov. 14, 2019.

Polymer Properties Database, Hydrocarbon Resins (C5 and C9 Resins), https://polymerdatabase.com/polymer%20classes/Hydrocarbon%20resins.html#:~:text=These%20resins%20are%20available%20in,100%20to%20150%C2%BOC.&text=C9%20resins%20are%20very%20versatile%20resins%20that%20are%20compatible%20with%20many%20polymers, Jan. 22, 2021.

Prasher et al. "Turning Carbon Nanotubes from Exceptional Heat Conductors into Insulators" Physical Review Letters 102, 105901 (2009) 4 pages.

Puyang Ruicheng Checmical Co., Ltd, "Petroleum Resin", http://pyrchg.com/petroleum-resin/, Last Accessed Jan. 20, 2021, 8 pages.

Search Report in European Application No. 18160620.3 dated May 25, 2018, 6 pages.

Shell Chemicals, "n-Pentane Data Sheet", Nov. 21, 2007, https://www.shell.com/business-customers/chemicals/our-products/solvents-hydrocarbon/pentanes/n-pentane/_jcr_content/par/tabbedcontent/tab/textimage.stream/1519786062416/b21d8f28fc2a3b338bff2244fae7300fdbf82653/datasheet-paraffinsnpentaneeurope.pdf., Last Accessed Jan. 20, 2021, 3 pages.

Teijin "Twaron—a versatile high-performance fiber", brochure (7 pages) accessed Oct. 17, 2017 at: http://www.teijinaramid.com/wp-content/uploads/2017/07/Twaron-product-brochure-English.pdf.

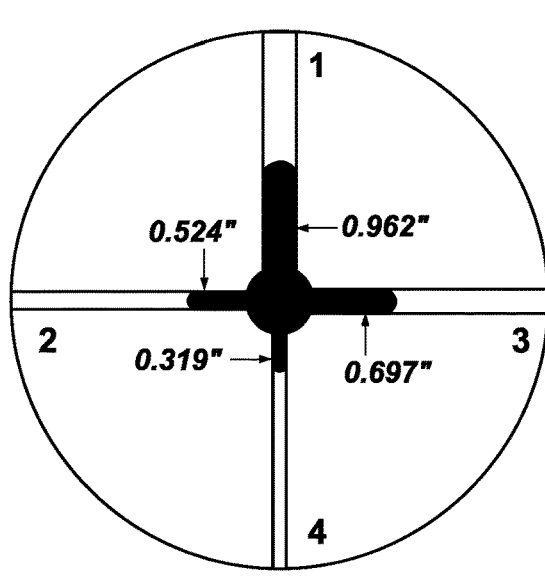
FIG. 3
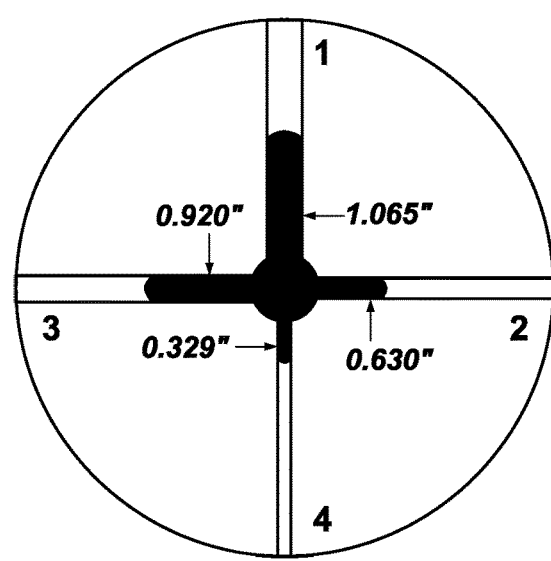
FIG. 4
FIG. 5

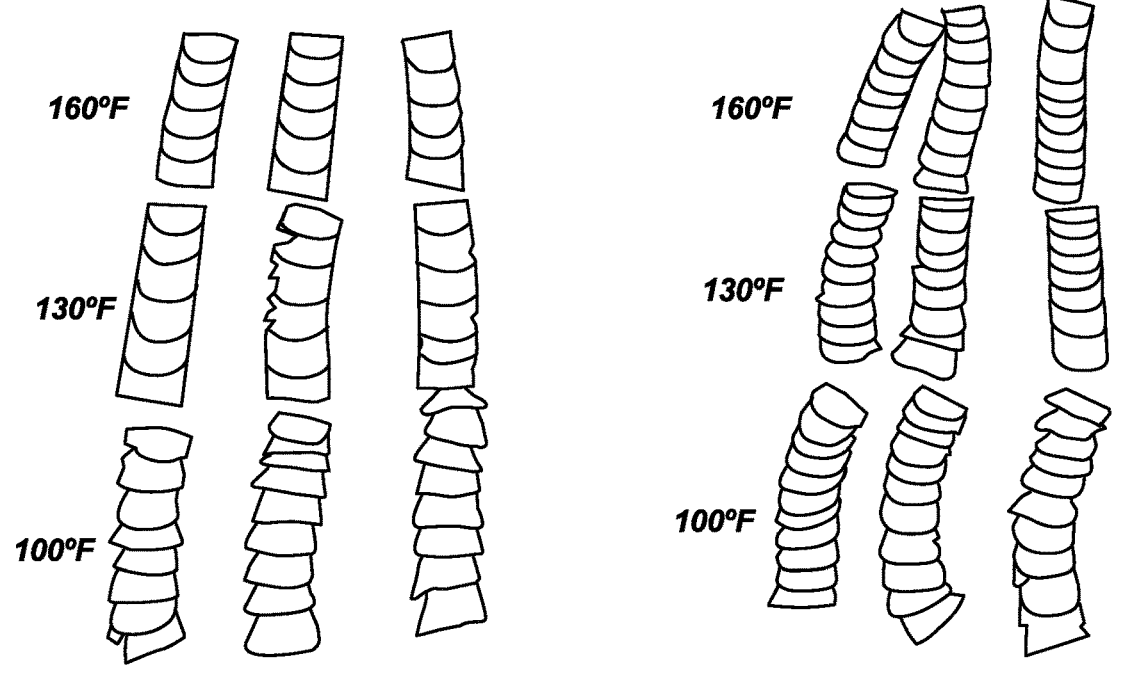
160°F
130°F
100°F
160°F
130°F
100°F
FIG. 6          FIG. 7
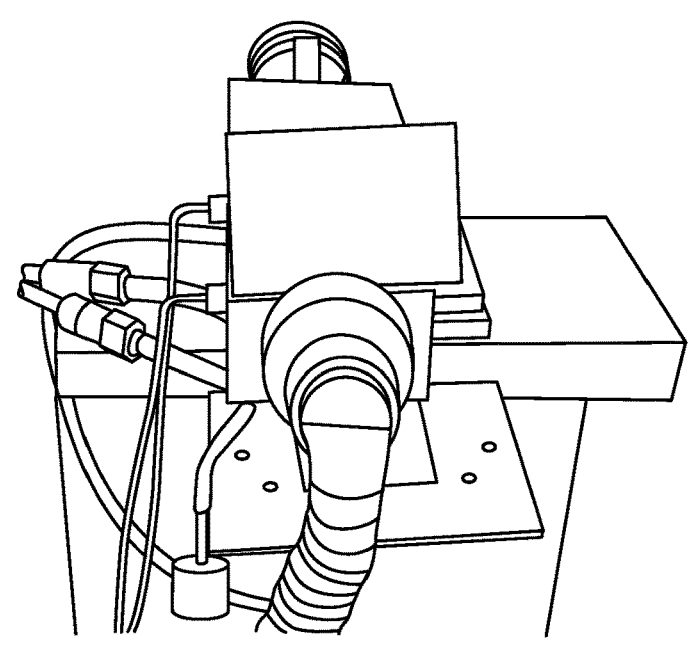
FIG. 8

PRECURSOR COMPOSITIONS FOR AN INSULATION AND RELATED METHODS

CROSS-REFERENCE TO RELATED APPLICATIONS

This application is a continuation of U.S. patent application Ser. No. 15/793,862, filed Oct. 25, 2017, which is related to U.S. Ser. No. 15/461,339, filed Mar. 16, 2017, entitled "PRECURSOR COMPOSITIONS FOR AN INSULATION, INSULATED ROCKET MOTORS, AND RELATED METHODS," now U.S. Pat. No. 10,612,492, issued Apr. 7, 2020; and to U.S. Ser. No. 15/726,731, filed Oct. 6, 2017, entitled "PRECURSOR COMPOSITIONS FOR AN INSULATION, INSULATED ROCKET MOTORS, AND RELATED METHODS," the disclosure of each of which is hereby incorporated herein in its entirety by this reference.

TECHNICAL FIELD

Embodiments of the disclosure relate to a precursor composition of an insulation for use in an article and to methods of insulating the article. More particularly, embodiments of the disclosure relate to a precursor composition including an aramid for an insulation for use in various locations on rocket motors or other articles and methods of insulating a rocket motor or other article.

BACKGROUND

Rocket motors include a case that houses an energetic fuel, which may also be characterized as a propellant. An insulation and an optional liner protect the case interior from thermal and erosive effects of particle streams generated by combustion of the energetic fuel or propellant. The rocket motor includes a nozzle operatively associated with the case to receive combustion products generated by combustion of the propellant and to expel the combustion products, generating thrust to propel the rocket motor and associated aerospace vehicle. The insulation is bonded to an interior surface of the case and is fabricated from a composition that, upon curing, is capable of enduring the extreme temperature, pressure, and turbulence conditions produced within the case. High temperature gases and erosive particles are produced with the case during combustion of the energetic fuel or propellant. During use and operation, the temperatures inside the case may reach about 2,760° C. (about 5,000° F.), pressures exceed about 1,500 pounds per square inch ("psi") (about 10.3 MPascal), and velocities of gases reach or exceed Mach 0.2. These conditions, along with a restrictive throat region provided along a passageway between the case and the nozzle, combine to create a high degree of turbulence within the case. In addition, the gases produced during combustion of the fuel or propellant contain high-energy particles that, under a turbulent environment, erode the insulation. Additionally, if the fuel or propellant penetrates through the insulation, the case may melt, be eroded, or otherwise be compromised, causing the rocket motor to fail.

Depending on the configuration of the rocket motor, various combinations of mechanical, thermal, and ablative properties are desired in different sections of the rocket motor. For some sections, high elongation properties are desirable while for other sections, good ablation and/or good mechanical properties are desirable. Some sections need good electrostatic discharge (ESD) properties, while other sections need good insulative properties. To provide the desired properties, conventional rocket motors employ different insulations in different sections of the rocket motor. However, using different insulations adds to the cost and complexity of manufacturing the rocket motor because multiple formulations must be produced and applied to the rocket motor. The insulations also include fibers or lack fibers depending on the desired mechanical, thermal, and ablative properties needed in the different sections. Asbestos fibers, glass fibers, carbon fibers, basalt fibers, aramid fibers, polybenzamide fibers, polybenzimidazole fibers, or polybenzoxazole fibers have been used in fiber-filled insulations.

BRIEF SUMMARY

Disclosed is an embodiment of a precursor composition comprising, before cure, ethylene propylene diene monomer (EPDM), an aramid, and a carbon material comprising carbon nanotubes, graphite, or a combination thereof.

Also disclosed is an embodiment of a precursor composition comprising, before cure, ethylene propylene diene monomer (EPDM), aramid fibers, a carbon material, an antioxidant, a chlorinated organic compound, a filler selected from the group consisting of zinc oxide, silica, magnesium hydroxide, and combinations thereof, stearic acid, a five carbon petroleum hydrocarbon, trimethylolpropane trimethacrylate or a poly(butadiene) resin, and 1,1-di-(t-butylperoxy)-3,3,5-(trimethylcyclohexane) polymer or dicumyl peroxide.

A rocket motor is also disclosed and comprises a case, an insulation on at least a portion of the case, and a propellant in the case. The insulation comprises a reaction product of ethylene propylene diene monomer (EPDM), an aramid, and a carbon material comprising carbon nanotubes, graphite, or a combination thereof.

A method of insulating a rocket motor is also disclosed. The method comprises applying a precursor composition of an insulation to at least a component of a rocket motor and curing the precursor composition to form the insulation. The precursor composition comprises ethylene propylene diene monomer (EPDM), an aramid, and a carbon material comprising carbon nanotubes, graphite, or a combination thereof.

BRIEF DESCRIPTION OF THE DRAWINGS

FIGS. 3-5 are photographs showing the flow properties of insulations according to embodiments of the disclosure in a spider mold;

FIGS. 6-8 are photographs showing the extrusion properties of precursor compositions of the insulation according to embodiments of the disclosure;

DETAILED DESCRIPTION

Figure 1:
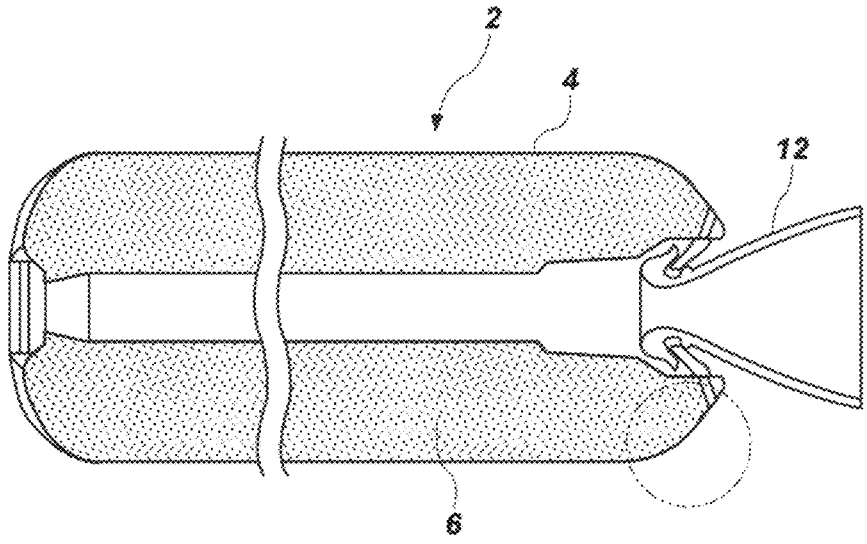
FIG. 1 is a cross-sectional view of a rocket motor including an insulation formed from a precursor composition according to an embodiment of the disclosure.

An insulation formed from a precursor composition including a polymer of ethylene propylene diene monomer (EPDM), an aramid, and a carbon material is disclosed. When used to insulate a rocket motor or other article to be insulated, the insulation may be characterized as "universal" in that the same insulation may be used on different regions of the particular rocket motor or article that require insulation. The universal insulation is formulated to protect different regions of the rocket motor or article that need protection from one or more of heat, erosion, and other extreme conditions experienced during use and operation of the rocket motor or other article. The universal insulation may be used as internal insulation of the rocket motor or other article, external insulation of the rocket motor or other article, or as a shear ply to couple a case of the rocket motor to a rocket skirt. The universal insulation provides improved or comparable mechanical, physical, rheological, thermal, and ablative properties compared to conventional aramid-filled EPDM-based insulations, while including fewer ingredients than the conventional aramid-filled EPDM-based insulations. By using the universal insulation having substantially similar or identical ingredients in multiple locations of the rocket motor, the cost and complexity of manufacturing the rocket motor or other article is reduced. Different regions of the rocket motor or article may also include the universal insulation having similar or identical ingredients except lacking the aramid.

The precursor composition of the insulation includes the EPDM, the aramid, the carbon material, an antioxidant, one or more fillers, a flame retardant, a processing aid, a plasticizer, a co-agent, and a curative. The ingredients of the precursor composition of the insulation are commercially available and, therefore, are less likely to become obsolete. As used herein, the term "precursor composition" means and includes ingredients of the composition before the ingredients are reacted (e.g., cured). Curing the precursor composition forms the insulation, which may then be applied to the rocket motor or other article.

As used herein, the terms "comprising," "including," "containing," "characterized by," and grammatical equivalents thereof are inclusive or open-ended terms that do not exclude additional, unrecited elements or method acts, but also include the more restrictive terms "consisting of" and "consisting essentially of" and grammatical equivalents thereof. As used herein, the term "may" with respect to a material, structure, feature or method act indicates that such is contemplated for use in implementation of an embodiment of the disclosure and such term is used in preference to the more restrictive term "is" so as to avoid any implication that other, compatible materials, structures, features and methods usable in combination therewith should or must be excluded.

As used herein, the term "substantially" in reference to a given parameter, property, or condition means and includes to a degree that one of ordinary skill in the art would understand that the given parameter, property, or condition is met with a degree of variance, such as within acceptable manufacturing tolerances. By way of example, depending on the particular parameter, property, or condition that is substantially met, the parameter, property, or condition may be at least 90.0% met, at least 95.0% met, at least 99.0% met, at least 99.9% met, or even 100.0% met.

The illustrations presented herein are not meant to be actual views of any particular device, but are merely idealized representations that are employed to describe the present disclosure. The figures are not necessarily drawn to scale. Additionally, elements common between figures may retain the same numerical designation.

The EPDM is a terpolymer of ethylene, propylene, and a non-conjugated diene. The non-conjugated diene may include, but is not limited to, ethylidene norbornene (ENB). The EPDM may be linear or branched, e.g., including controlled long chain branching (LCB). Using a linear EPDM or branched EPDM may affect the extent of cross-linking of the precursor composition following cure in addition to properties of the uncured precursor composition and cured precursor composition. The EPDM may have a diene content of from about 1% by weight (wt %) to about 10 wt %, such as about 5.0 wt %. In some embodiments, the EPDM has a diene content of about 5.0 wt %. In another embodiment, the EPDM has a diene content of about 6.0 wt %. The EPDM may have an ethylene content of greater than about 40 wt %, such as between about 40 wt % and about 85 wt %, between about 40 wt % and about 75 wt %, or between about 45 wt % and about 55 wt %. In some embodiments, the EPDM has an ethylene content of about 50 wt % or about 53 wt %. The EPDM may be commercially available from Dow Chemical Company (Midland, MI) under the NORDEL® tradename or from LANXESS Deutschland GmbH (Marl, Germany) under the KELTAN® tradename. By way of example only, the EPDM may be NORDEL® IP 4520 or KELTAN® 2650. However, other EPDM materials having the above properties may be used, which reduces obsolescence issues. The EPDM may be present in the precursor composition of the insulation at from about 70 parts by weight to about 150 parts by weight, such as from about 50 parts by weight to about 120 parts by weight or from about 60 parts by weight to about 110 parts by weight. In some embodiments, the EPDM is NORDEL® IP 4520, has a diene content of about 5.0 wt %, an ethylene content of about 50.0 wt %, and is present in the precursor composition of the insulation at about 65.8 parts by weight. In other embodiments, the EPDM is KELTAN® 2650, has a diene content of about 6.0 wt %, an ethylene content of about 53 wt %, and is present in the precursor composition of the insulation at about 80.5 parts by weight or about 100 parts by weight.

The aramid (also known as an aromatic polyamide, a polyaramid, or para-aramid) in the precursor composition may be poly-p-phenylene terephthalamide, poly-m-phenylene isophthalamide, copoly-p-phenylene-3,4'-oxydiphenylene-terephthalamide, or mixed aliphatic-aromatic polyamides, such as poly-m-xylylene adipamide, poly-m-xylylene pimelamide, poly-m-xylylene azelamide, poly-p-xylylene azelamide, poly-p-xylylene decanamide, or combinations thereof. In some embodiments, the aramid comprises poly-p-phenylene terephthalamide. The aramid may be present in the precursor composition of the insulation at from about 5.0 parts by weight to about 25.0 parts by weight, such as from about 10.0 parts by weight to about 15.0 parts by weight, from about 10.0 parts by weight to about 20.0 parts by weight, from about 15.0 parts by weight to about 20.0 parts by weight, from about 15.0 parts by weight to about 25.0 parts by weight, or from about 20.0 parts by weight to about 25.0 parts by weight. In some embodiments, the aramid is present at about 11.0 parts by weight. In other embodiments, the aramid is present at about 20.0 parts by weight. In other embodiments, the aramid is present at about 21.0 parts by weight.

The aramid may be used in fiber form. By way of example only, the aramid may be poly-p-phenylene terephthalamide fibers, such as those commercially available under the TWARON® tradename from Teijin Aramid B.V. (Arnhem, Netherlands). The poly-p-phenylene terephthalamide fibers exhibit high strength-to-weight properties, high modulus, high dimensional stability, low flammability, a highly crystalline structure, and no melting point. In some embodiments, the aramid is a pulp form of TWARON® 1099 para-aramid. The TWARON® 1099 para-aramid has a specific surface area in a range of from about 9 m²/g to about 13 m²/g with a fiber length of from about 0.9 mm to about 1.35 mm and a moisture content of from about 4% by weight to about 8% by weight.

While the aramid is described herein as being poly-p-phenylene terephthalamide fibers, other forms of poly-p-phenylene terephthalamide may be used including, but not limited to, filament yarn, staple fiber, pulp, paper, short-cut fiber, fabric, laminate, powder, or tape. In some embodiments, the pulp form of the poly-p-phenylene terephthalamide fibers is used. The pulp form is produced from a filament yarn that is cut, suspended in water, and fibrillated. The pulp form of the poly-p-phenylene terephthalamide fibers is available as a wet pulp or a dry pulp and at various fiber lengths and various degrees of fibrillation. The TWARON® 1099 para-aramid is formed from a TWARON® filament yarn having a diameter of about 12 m and having less than about 1% of a surface finish. These yarns are then heavily fibrillated to form the TWARON® 1099 para-aramid in the pulp form. The pulp form of the poly-p-phenylene terephthalamide fibers is discontinuous and does not exhibit a specific length. When processed, the pulp form breaks down into fibers of different lengths. The aramid functions as a low density filler and improves mechanical properties of the insulation formed from the precursor composition.

While the examples described below include TWARON® type aramid pulp 1099, other fibers may be used, such as glass, boron, boron nitride, silicon carbide, graphite, polyimide, polybenzimidazole, polybenzothiazole, polybenzamide, polybenzoxazole, polyethylene, cellulose, sisal, nylon, mineral wool, polyester, or combinations thereof.

The carbon material of the precursor composition of the insulation may be a conductive carbon material, depending on the desired properties of the uncured precursor composition or of the insulation, such as the desired electrostatic discharge (ESD) properties. The carbon material may include carbon nanotubes, graphite, conductive carbon black, or a combination thereof. If insulative properties are desired, the carbon material may not be present. If present, the carbon material may account for from about 5.0 parts by weight to about 50.0 parts by weight of the precursor composition of the insulation, such as from about 8.0 parts by weight to about 46.0 parts by weight of the precursor composition of the insulation or from about 20.0 parts by weight to about 46.0 parts by weight of the precursor composition of the insulation.

The carbon material may include single-walled carbon nanotubes or multi-walled carbon nanotubes, either in an undispersed form (e.g., a raw material, such as a powder) or in a pre-dispersed form. Multi-walled carbon nanotubes in the pre-dispersed form may include, but are not limited to, those commercially available from Arkema Inc. (Exton, PA) under the GRAPHISTRENGTH® tradename, such as GRAPHISTRENGTH® EPDM 20, which contains the multi-walled carbon nanotubes pre-dispersed in EPDM at a concentration of about 17 wt % (about 20 parts by weight). The multi-walled carbon nanotubes may be present in the precursor composition of the insulation at from about 3.0 parts by weight to about 45.0 parts by weight, such as from about 3.0 parts by weight to about 10.0 parts by weight, from about 15.0 parts by weight to about 30.0 parts by weight, or from about 35.0 parts by weight to about 45.0 parts by weight. In some embodiments, the multi-walled carbon nanotubes are present in the precursor composition at about 4.0 parts by weight, about 23.5 parts by weight, or about 41.2 parts by weight.

Other forms of carbon may be used in the precursor composition of the insulation, such as graphite, expanded graphite, or expandable graphite. In some embodiments, the carbon material is expandable graphite. The expandable graphite may exhibit an expansion ratio of from about 30 (ml/g) min to about 250 (ml/g) min and a carbon content of from about 80% to about 99%, such as about 80%, about 85%, about 90%, about 95%, or about 99%. The expandable graphite has an intercalant compound, such as sulfuric acid, nitric acid, or acetic acid, between graphene layers of the expandable graphite. When the expandable graphite is exposed to heat, the intercalant compound is volatilized, which separates the graphene layers and increases the volume of the graphene layers. The expandable graphite may have an average particle size of less than about 75 μm, greater than about 75 μm, less than about 180 μm, greater than about 180 μm, less than about 250 μm, or greater than about 300 μm. In some embodiments, the expandable graphite is expandable graphite 1722HT from Asbury Carbons Inc. (Asbury, NJ). The expandable graphite may be present in the precursor composition of the insulation at from about 1.0 part by weight to about 15.0 parts by weight, such as from about 2.0 parts by weight to about 10.0 parts by weight, from about 3.0 parts by weight to about 8.0 parts by weight or from about 3.0 parts by weight to about 5.0 parts by weight. In some embodiments, the expandable graphite is present in the precursor composition at about 4.0 parts by weight.

In some embodiments, the precursor composition may include carbon nanotubes and graphite. The carbon nanotubes may be multi-walled carbon nanotubes in the pre-dispersed form, such as GRAPHISTRENGTH® EPDM 20, and the graphite may be expandable graphite, such as expandable graphite 1722HT from Asbury Carbons Inc. (Asbury, NJ).

Without being bound by any theory, it is believed that the carbon material provides ablative properties to the precursor composition of the insulation in addition to the ESD properties. It was unexpected that the carbon material would improve the ablative properties of the insulation since carbon materials are known in the art to be difficult to disperse and ablative properties are usually improved for homogeneous compositions. It is known in the art that carbon nanotubes agglomerate and are difficult to disperse in EPDM-based compositions. However, it was unexpectedly found that the precursor compositions including the multi-walled carbon nanotubes and the expandable graphite exhibited improved ablative properties.

The antioxidant may be a hydroquinoline compound, such as a polymerized 1,2-dihydro-2,2,4-trimethylquinoline, which is commercially available from Vanderbilt Chemicals, LLC (Norwalk, CT) under the AGERITE® tradename. By way of example only, the antioxidant may be AGERITE® Resin D. The antioxidant may also be an amine compound, a phenol compound, another antioxidant, or combinations thereof, including combinations with the polymerized 1,2-dihydro-2,2,4-trimethylquinoline. The antioxidant may be present in the precursor composition of the insulation at from about 0.35 part by weight to about 0.75 part by weight. In some embodiments, the antioxidant is AGERITE® Resin D, a polymerized 1,2-dihydro-2,2,4-trimethylquinoline, and is present in the precursor composition of the insulation at about 0.5 part by weight.

The filler may be zinc oxide, silica (silicon dioxide), magnesium hydroxide, or a combination thereof. The zinc oxide may include, but is not limited to, a propionic acid coated zinc oxide having a surface area of from about 4.0 m²/g to about 6.0 m²/g and a particle size of from about 0.18 μm to about 0.27 μm, such as Zoco 672, which is commercially available from Zochem Inc. (Brampton, Canada). In addition to the powder form, zinc oxide in a pellet form may be used, such as Zoco 627. The silica may be an amorphous, precipitated silica, such as that commercially available from PPG Industries, Inc. (Pittsburgh, PA) under the HI-SIL® tradename. By way of example only, HI-SIL® 233 silica having a surface area (BET) of 135 m2/g may be used as the filler. The magnesium hydroxide may be a non-halogenated, high purity powder, such as that commercially available from Martin Marietta Magnesia Specialties, LLC (Baltimore, MD) under the MAGSHIELD® tradename. By way of example only, the magnesium hydroxide may be MAGSHIELD® S. The purity of the magnesium hydroxide may be greater than about 95%, such as greater than about 97% or greater than about 98%. The magnesium hydroxide may also provide flame retardance to the precursor composition of the insulation. In some embodiments, the precursor composition includes zinc oxide and silica. In other embodiments, the precursor composition includes magnesium hydroxide.

The filler may be present in the precursor composition of the insulation at from about 0.5 part by weight to about 10.0 parts by weight, such as from about 1.0 part by weight to about 10.0 parts by weight, from about 0.5 part by weight to about 5.0 parts by weight, from about 0.5 part by weight to about 9.0 parts by weight, or from about 1.0 part by weight to about 5.0 parts by weight. Zinc oxide may be present in the precursor composition of the insulation at from about 2.1 parts by weight to about 4.5 parts by weight, the amorphous, precipitated silica may be present in the precursor composition of the insulation at from about 3 parts by weight to about 8 parts by weight, and the magnesium hydroxide may be present in the precursor composition of the insulation at from about 0.5 part by weight to about 8 parts by weight. In some embodiments, the filler includes Zoco 672, the zinc oxide, and HI-SIL® 233, the amorphous, precipitated silica. The zinc oxide is present in the precursor composition of the insulation at about 3.0 parts by weight and the amorphous, precipitated silica is present in the precursor composition of the insulation at about 6.0 parts by weight. In other embodiments, the filler includes MAGSHIELD® S, the magnesium hydroxide, which is present in the precursor composition of the insulation at about 1.0 part by weight or about 4.0 parts by weight.

The flame retardant may be a chlorinated organic compound, such as a solid chlorinated paraffin, a polychlorinated polycyclic compound, a chloroprene, or combinations thereof. The flame retardant may be present in the precursor composition of the insulation at from about 5.0 parts by weight to about 30.0 parts by weight, such as from about 5.0 parts by weight to about 10.0 parts by weight, from about 10.0 parts by weight to about 25.0 parts by weight, or from about from about 15.0 parts by weight to about 30.0 parts by weight. The solid chlorinated paraffin may include, but is not limited to, that commercially available from Dover Chemical Corporation (Dover, OH) under the CHLOREZ® tradename. The solid chlorinated paraffin may be a 70% chlorinated paraffin, such as CHLOREZ® 700. In some embodiments, the solid chlorinated paraffin is present in the precursor composition of the insulation at about 20 parts by weight. In other embodiments, the solid chlorinated paraffin is present in the precursor composition of the insulation at about 8 parts by weight. The flame retardant may also be a polychlorinated polycyclic compound, such as DECHLORANE PLUS® 25, which is commercially available from Occidental Chemical Corp. (Dallas, TX). The chloroprene may be Neoprene GRT, which is a sulfur-modified polychloroprene and is commercially available from Denka Performance Elastomer, LLC. (New Castle, DE). Combinations of the flame retardants may also be used. In some embodiments, the flame retardant includes the solid chlorinated paraffin at about 20 parts by weight. In other embodiments, the flame retardant includes the solid chlorinated paraffin at about 8 parts by weight, the polychlorinated polycyclic compound at about 8 parts by weight, and the chloroprene at about 10 parts by weight.

The processing aid may be a fatty acid or fatty acid derivative, such as that commercially available from PMC Biogenix, Inc. (Memphis, TN) under the INDUSTRENE® tradename. The fatty acid may be a stearic acid ($C_{17}H_{35}CO_2H$), such as INDUSTRENE® B. The stearic acid may be present in the precursor composition of the insulation at from about 0.35 part by weight to about 0.75 part by weight. In some embodiments, the stearic acid is present in the precursor composition of the insulation at about 0.5 part by weight.

The plasticizer may be an aliphatic resin, such as that commercially available from TOTAL Cray Valley (Exton, PA) under the WINGTACK® tradename. The aliphatic resin may be a five carbon (C5) petroleum hydrocarbon, such as WINGTACK® 95. The aliphatic resin may be present in the precursor composition of the insulation at from about 4.0 parts by weight to about 15.0 parts by weight, such as from about 8.0 parts by weight to about 12.0 parts by weight or from about 10.0 parts by weight to about 11.0 parts by weight. In some embodiments, the aliphatic resin is present in the precursor composition of the insulation at about 10 parts by weight. In other embodiments, the aliphatic resin is present in the precursor composition of the insulation at about 11 parts by weight.

The co-agent may be a low volatility trifunctional monomer, such as trimethylolpropane trimethacrylate, which is commercially available from Sartomer Americas (Exton, PA) as SR350. Alternatively, the co-agent may be a poly(butadiene) resin, such as a high vinyl poly(butadiene), which is commercially available from Cray Valley USA, LLC (Exton, PA) under the RICON® tradename. One or more co-agents may be used. The co-agent may be present in the precursor composition of the insulation at from about 1.0 part by weight to about 12.0 parts by weight, such as from about 2.0 parts by weight to about 10.0 parts by weight or from about 2.0 parts by weight to about 8 parts by weight. In some embodiments, the trimethylolpropane trimethacrylate is present in the precursor composition of the insulation at about 5 parts by weight. In other embodiments, the trimethylolpropane trimethacrylate is present in the precursor composition of the insulation at about 3.6 parts by weight.

The curative may be a crosslinking peroxide, such as that commercially available from Arkema Inc. (Exton, PA) under the LUPEROX® tradename. One or more curatives may be used. By way of example only, the curative may be LUPEROX® 231 XL40, which is a 40% active dispersion of LUPEROX® 231 (1,1-di-(t-butylperoxy)-3,3,5-trimethyl-cyclohexane) polymer initiator on calcium carbonate. The 1,1-di-(t-butylperoxy)-3,3,5-trimethylcyclohexane polymer initiator may also be used in pure form, such as without the inert support. Alternatively, the curative may be dicumyl peroxide (DCP), which may be used in pure form or with an inert support. The curative may be present in the precursor composition of the insulation at from about 1.0 part by weight to about 12.0 parts by weight, such as from about 1.0 part by weight to about 6.0 parts by weight or from about 5.0 parts by weight to about 12 parts by weight. In some embodiments, the curative is present in the precursor composition of the insulation at about 8.0 parts by weight. In other embodiments, the curative is present in the precursor composition of the insulation at about 7.0 parts by weight. In yet other embodiments, the curative is present in the precursor composition of the insulation at about 5.7 parts by weight.

While specific examples of the antioxidant, co-agent, and curative are provided above, other antioxidants, co-agents, and/or curatives may be used depending on the desired shelf life of the uncured precursor composition or of the insulation, or on the desired mechanical properties of the insulation. The antioxidant may be selected depending on whether the precursor composition is to have an increased or decreased shelf life. Other co-agents and curatives may be selected depending on the desired mechanical properties or cure temperature requirements of the insulation.

The precursor compositions of the insulation may include fewer ingredients than the conventional aramid-filled EPDM insulations, reducing the cost and complexity of manufacturing an article including the insulation. In some embodiments, the precursor composition of the insulation has 12 or 13 ingredients, compared to at least 16 ingredients in the conventional aramid-filled EPDM insulations. By including fewer ingredients, obsolescence issues with the ingredients may be reduced, such as qualification costs for future materials. The ingredients may also be commercially available, which further reduces obsolescence issues. The precursor compositions according to embodiments of the disclosure may also have a longer shelf life at room temperature (from about 20° C. to about 25° C.) compared to the conventional aramid-filled EPDM insulations, which have a shelf life at about 0° C. for up to one year.

The precursor composition may be prepared by combining (e.g., mixing) the EPDM, aramid, carbon material, antioxidant, filler, flame retardant, processing aid, plasticizer, co-agent, and curative in a mixer, such as an internal mixer. All of the ingredients are solid at room temperature and are combined in the mixer to form a homogeneous precursor composition. The ingredients, including the aramid, are homogeneously dispersed in the precursor composition. The pulp form of the aramid used in the precursor composition does not have a specified length and breaks down into shorter length fibers during processing of the precursor composition. Shear in the mixer generates a sufficient amount of heat to soften the EPDM, enabling the homogeneous precursor composition to be formed without adding a solvent. Thus, the precursor composition may be prepared by a solvent-less process. Since no solvents are used, a solvent removal process, such as drying or solvent evaporation, is not needed before curing the precursor composition to form the insulation.

The precursor composition may be shaped into its desired form, such as by extruding, calendaring, or compression molding. In some embodiments, the precursor composition is extrudable. The extrudability of the precursor composition is comparable to that of the conventional aramid-filled EPDM insulations. The precursor composition may exhibit a sufficiently low viscosity such that the precursor composition has a flowable consistency before curing. As used herein, the term "flowable" means and includes a sufficiently low viscosity that enables the precursor composition to change shape or direction substantially uniformly in response to heat and/or shear, such that the precursor composition readily flows out of a container at room temperature. The flow behavior and extrudability of the precursor composition reduces the cost of manufacturing the rocket motor because the precursor composition or resulting insulation may be applied to the rocket motor by automated layup processes. By reducing or eliminating manual layup processes, the cost of manufacturing the rocket motor may be reduced. By way of example only, the precursor composition may be calendared to a desired thickness, such as a thickness of about 0.1 inch (about 0.254 cm). Once prepared, the precursor composition may be applied to the rocket motor or other article and cured. Alternatively, the precursor composition may be stored until use. The precursor composition may be used as internal insulation or external insulation of a rocket motor, or as a shear ply depending on the configuration of the rocket motor. The precursor composition may be used as a shear ply to couple a case of the rocket motor to a rocket skirt. The precursor composition may be applied to the rocket motor by hand layup or by automated layup processes.

In addition to being used as insulation in rocket motors, the insulation may be used in other articles where protection from heat and gases is desired. For example, the insulation may be used for heat and gas protection in under-the-hood applications in automobiles. The insulation may also be used in conveyor belts and in noise-damping applications in automobile and other fields. In addition, since the insulation may be extruded, compression molded, or calendared, the insulation may be used in routine rubber applications including, but not limited to, such applications as hoses, gaskets, seals, isolators and mounts, cushions, air emission hoses, and dock fenders.

Methods of applying the precursor composition to the rocket motor and curing the precursor composition are known in the art and, therefore, are not described in detail herein. The precursor composition may be applied to a case of the rocket motor and cured, forming the insulation on an inner surface of the case. While the curing may occur at room temperature (about 20° C.-25° C.), the curing may be accelerated by applying at least one of heat and pressure as known in the art. Alternatively, the precursor composition may be applied to a mandrel, cured to form the insulation, and subsequent layers of the rocket motor formed over the insulation. Alternatively, the precursor composition may be applied to the mandrel, subsequent layers of the rocket motor formed over the precursor composition, and the entire assembly cured substantially simultaneously.

Figure 2:
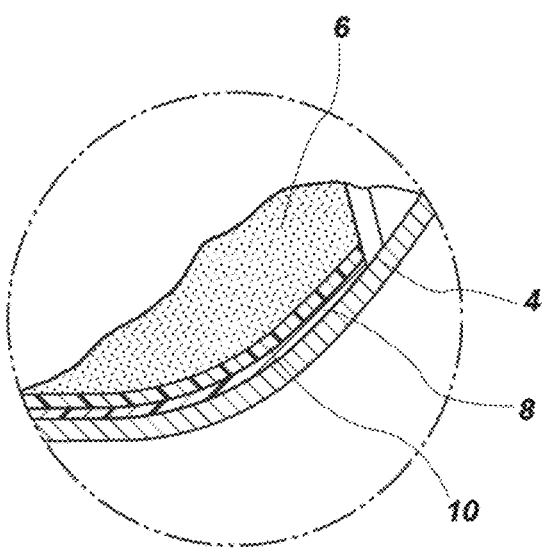
FIG. 2 is an enlarged view of the portion of the rocket motor encircled in FIG. 1.

As shown in FIGS. 1 and 2, insulation 8 may be used in a rocket motor 2. The rocket motor 2 includes a case 4 produced from a rigid, durable material, such as a metal or composite. The case 4 houses a solid propellant 6 that combusts to provide the thrust necessary to propel the rocket motor 2. The insulation 8 is applied to an inner surface of the case 4, and is present between the case 4 of the rocket motor 2 and the propellant 6. An optional liner 10 may be present between the insulation 8 and the propellant 6. Methods for loading the case 4 with the insulation 8, optional liner 10, and propellant 6 are known in the art and, therefore, are not described in detail herein. Nozzle 12 is operatively associated with the case 4 to receive combustion products generated by combustion of the propellant 6 and to expel the combustion products, generating thrust to propel the rocket motor 2. During use and operation of the rocket motor 2, the insulation 8 protects the case 4 from heat and particle streams that are generated by combustion of the propellant 6.

While the insulation 8 is shown as being applied to the inner surface of the case 4, the insulation 8 may be used on other regions of the rocket motor 2, either internally, externally, or both. For example, the insulation 8 may provide ablative protection to an external bulk of the case 4 and nozzle 12. Additionally, while the insulation 8 may be used for insulating a solid rocket motor and other large-scale motors, the insulation may also be used with other motors, such as biliquid, hybrid and reverse hybrid motors, or with rocket motor-propelled missiles. A single formulation of the insulation 8 may be used in multiple locations in the rocket motor 2. Alternatively, different formulations of the insulation 8 may also be used in the rocket motor 2, with precursor compositions of the insulation 8 differing in that some include the aramid as described herein and others are fiber-free as described in U.S. patent application Ser. No. 15/726,731, filed Oct. 6, 2017, and Ser. No. 15/461,339, filed on Mar. 16, 2017, the disclosure of each of which is incorporated by reference herein in its entirety. The different formulations of the insulation 8 may include substantially the same or identical ingredients, with relative amounts of the ingredients being different.

A method of insulating the rocket motor 2 is also described. The method comprises producing the precursor composition that includes the ingredients described above. The precursor composition is deposited on, or applied to, the inner surface of the case 4 of the rocket motor 2. The precursor composition is subsequently cured to form the insulation 8. The rocket motor 2 may also include multiple precursor compositions of the insulation 8 having similar or identical ingredients. Since these precursor compositions of the insulation 8 include similar or identical ingredients, the precursor compositions may be cured substantially simultaneously in the rocket motor 2, reducing fabrication costs and time.

The insulation 8 formed from precursor compositions according to embodiments of the disclosure may exhibit comparable or improved mechanical and ablative properties and comparable or improved processing characteristics compared to the conventional aramid-filled EPDM-based insulations. By way of example only, the insulation 8 formed from the precursor compositions may exhibit comparable or improved modulus, stress capability, and strain capability compared to the conventional aramid-filled EPDM-based insulations. The insulation 8 may also have better tack and ESD properties compared to the conventional aramid-filled EPDM insulations. The insulation 8 may also be compatible with the solid propellant 6 used in the rocket motor 2 and non-permeable to gases produced as volatile, combustion products during use of the insulation. The insulation 8 formed from the precursor compositions according to embodiments of the disclosure may also have a longer shelf life at room temperature (from about 20° C. to about 25° C.) compared to the conventional aramid-filled EPDM-based insulations, which have a shelf life at about 0° C. for up to one year.

The following examples serve to explain embodiments of the disclosure in more detail. These examples are not to be construed as being exhaustive or exclusive as to the scope of this disclosure.

EXAMPLES

Example 1

Precursor Composition Formulations

Precursor compositions including the ingredients shown in Table 1 were produced. Initial formulations including the ingredients shown in Table 1 were prepared.

TABLE 1

| | Formulations of Precursor Compositions | | |
| --- | --- | --- | --- |
| Ingredient | EPDM Composition A Amount (parts by weight) | EPDM Composition B Amount (parts by weight) | EPDM Composition C Amount (parts by weight) |
| NORDEL ® IP 4520 EPDM | 65.8 | 0 | 0 |
| KELTAN ® 2650 EPDM | 0 | 80.5 | 100 |
| AGERITE ® Resin D | 0.5 | 0.5 | 0.5 |
| Zoco 672 | 3.0 | 0 | 0 |
| HI-SIL ® 233 | 6.0 | 0 | 0 |
| MAGSHIELD ® S | 0 | 4.0 | 1.0 |
| CHLOREZ ® 700 | 20.0 | 20.0 | 8.0 |
| DECHLORANE PLUS ® | 0 | 0 | 8.0 |
| Expandable Graphite 1722HT | 4.0 | 4.0 | 4.0 |
| GRAPHISTRENGTH ® EPDM 20[a] | 41.2 | 23.5 | 0 |
| Multi-walled Carbon Nanotubes[b] | 0 | 0 | 4.0 |
| INDUSTRENE ® B | 0.5 | 0.5 | 0.5 |
| WINGTACK ® 95 | 10.0 | 11.0 | 10.0 |
| SR350 | 3.6 | 5.0 | 5.0 |
| TWARON ® pulp type 1099 | 21.0 | 20.0 | 20.0 |
| Neoprene GRT | 0 | 0 | 10.0 |
| LUPEROX ® 231 XL40 | 7.0 | 8.0 | 5.72 |

[a]A dispersion of multi-walled carbon nanotubes in 20% EPDM
[b]An undispersed form of multi-walled carbon nanotubes Each of the ingredients was commercially available and was used as received. The ingredients in Table 1 were added to an internal mixer and combined to produce the precursor compositions.

Based on the mechanical, physical, and thermal properties of the formulations in Table 1, additional formulations were prepared and are shown in Tables 2-7. Each of the ingredients was commercially available and was used as received. The ingredients of the respective formulations F-T were added to an internal mixer and combined to produce the respective precursor compositions. The formulations F-T were mixed at a 300 g scale or 5 pound scale.

To determine the effect of aramid loading and a DCP-based cure system, formulations including various amounts of the aramid fibers and DCP were prepared and are shown in Table 2.

TABLE 2

Formulations of Precursor Compositions

| Ingredient | EPDM Comp. F Amount (parts by weight) | EPDM Comp. G Amount (parts by weight) | EPDM Comp. H Amount (parts by weight) | EPDM Comp. I Amount (parts by weight) | EPDM Comp. J Amount (parts by weight) | EPDM Comp. K Amount (parts by weight) |
|---|---|---|---|---|---|---|
| KELTAN ® 2650 EPDM | 65.8 | 65.8 | 65.8 | 65.8 | 65.8 | 65.8 |
| CHLOREZ ® 700 | 18.0 | 18.0 | 18.0 | 18.0 | 18.0 | 18.0 |
| AGERITE ® Resin D | 0.5 | 0.5 | 0.5 | 0.5 | 0.5 | 0.5 |
| INDUSTRENE ® B | 0.5 | 0.5 | 0.5 | 0.5 | 0.5 | 0.5 |
| Expandable Graphite 1722HT | 3.0 | 3.0 | 3.0 | 3.0 | 3.0 | 3.0 |
| GRAPHISTRENGTH ® EPDM 20[a] | 41.2 | 41.2 | 41.2 | 41.2 | 41.2 | 41.2 |
| TWARON ® pulp type 1099 | 17.0 | 15.0 | 13.0 | 17.0 | 15.0 | 13.0 |
| MAGSHIELD ® S | 3.0 | 3.0 | 3.0 | 3.0 | 3.0 | 3.0 |
| RICON ® 150 | 2.0 | 2.0 | 2.0 | 2.0 | 2.0 | 2.0 |
| Dicumyl peroxide | 1.75 | 1.75 | 1.75 | 2.0 | 2.0 | 2.0 |

[a]A dispersion of multi-walled carbon nanotubes in 20% EPDM

To determine the effect of the flame retardant, formulations including various amounts of the solid chlorinated paraffin were prepared and are shown in Table 3.

TABLE 3

Formulations of Precursor Compositions

| Ingredient | EPDM Composition G Amount (parts) | EPDM Composition Q Amount (parts by weight) | EPDM Composition R Amount (parts by weight) |
|---|---|---|---|
| KELTAN ® 2650 EPDM | 65.8 | 65.8 | 65.8 |
| CHLOREZ ® 700 | 18.0 | 19.0 | 21.0 |
| AGERITE ® Resin D | 0.5 | 0.5 | 0.5 |
| INDUSTRENE ® B | 0.5 | 0.5 | 0.5 |
| Expandable Graphite 1722HT | 3.0 | 3.0 | 3.0 |
| GRAPHISTRENGTH EPDM 20[a] | 41.2 | 41.2 | 41.2 |
| TWARON ® pulp type 1099 | 15.0 | 15.0 | 15.0 |
| MAGSHIELD ® S | 3.0 | 3.0 | 3.0 |
| RICON ® 150 | 2.0 | 2.0 | 2.0 |
| Dicumyl peroxide | 1.75 | 1.75 | 1.75 |

[a]A dispersion of multi-walled carbon nanotubes in 20% EPDM

To determine the effect of the plasticizer, formulations including various amounts of the C5 petroleum hydrocarbon were prepared and are shown in Table 4.

TABLE 4

Formulations of Precursor Compositions

| Ingredient | EPDM Composition Q Amount (parts) | EPDM Composition S Amount (parts) | EPDM Composition T Amount (parts) |
|---|---|---|---|
| KELTAN ® 2650 EPDM | 65.8 | 65.8 | 65.8 |
| CHLOREZ ® 700 | 19.0 | 19.0 | 21.0 |
| AGERITE ® Resin D | 0.5 | 0.5 | 0.5 |
| INDUSTRENE ® B | 0.5 | 0.5 | 0.5 |
| WINGTACK ® 95 | 0 | 2.0 | 4.0 |
| Expandable Graphite 1722HT | 3.0 | 3.0 | 3.0 |

TABLE 4-continued

Formulations of Precursor Compositions

| Ingredient | EPDM Composition Q Amount (parts) | EPDM Composition S Amount (parts) | EPDM Composition T Amount (parts) |
|---|---|---|---|
| GRAPHISTRENGTH ® EPDM 20[a] | 41.2 | 41.2 | 41.2 |
| TWARON ® pulp type 1099 | 15.0 | 15.0 | 15.0 |
| MAGSHIELD ® S | 3.0 | 3.0 | 3.0 |
| RICON ® 150 | 2.0 | 2.0 | 2.0 |
| Dicumyl peroxide | 1.75 | 1.75 | 1.75 |

[a]A dispersion of multi-walled carbon nanotubes in 20% EPDM

To determine the effect of the co-agent, formulations including various amounts of the poly(butadiene) resin were prepared and are shown in Table 5.

TABLE 5

Formulations of Precursor Compositions

| Ingredient | EPDM Composition L Amount (parts by weight) | EPDM Composition M Amount (parts by weight) |
|---|---|---|
| KELTAN ® 2650 EPDM | 65.8 | 65.8 |
| CHLOREZ ® 700 | 15.0 | 15.0 |
| AGERITE ® Resin D | 0.5 | 0.5 |
| INDUSTRENE ® B | 0.5 | 0.5 |
| WINGTACK ® 95 | 4.0 | 4.0 |
| Expandable Graphite 1722HT | 3.0 | 3.0 |
| GRAPHISTRENGTH ® EPDM 20[a] | 41.2 | 41.2 |
| TWARON ® pulp type 1099 | 11.0 | 11.0 |
| MAGSHIELD ® S | 3.0 | 3.0 |
| RICON ® 150 | 2.0 | 5.0 |
| Dicumyl peroxide | 1.75 | 1.75 |

[a]A dispersion of multi-walled carbon nanotubes in 20% EPDM

To determine the effect of the curative, formulations including various amounts of the DCP were prepared and are shown in Table 6.

TABLE 6

Formulations of Precursor Compositions

| Ingredient | EPDM Composition N Amount (parts by weight) | EPDM Composition L Amount (parts by weight) | EPDM Composition O Amount (parts by weight) |
|---|---|---|---|
| KELTAN ® 2650 EPDM | 65.8 | 65.8 | 65.8 |
| CHLOREZ ® 700 | 15.0 | 15.0 | 15.0 |
| AGERITE ® Resin D | 0.5 | 0.5 | 0.5 |
| INDUSTRENE ® B | 0.5 | 0.5 | 0.5 |
| WINGTACK ® 95 | 4.0 | 4.0 | 4.0 |
| Expandable Graphite 1722HT | 3.0 | 3.0 | 3.0 |
| GRAPHISTRENGTH ® EPDM 20ᵃ | 41.2 | 41.2 | 41.2 |
| TWARON ® pulp type 1099 | 11.0 | 11.0 | 11.0 |
| MAGSHIELD ® S | 3.0 | 3.0 | 3.0 |
| RICON ® 150 | 2.0 | 2.0 | 2.0 |
| Dicumyl peroxide | 1.5 | 1.75 | 2.0 | aA dispersion of multi-walled carbon nanotubes in 20% EPDM

To determine the effect of the EPDM, formulations including various types of EPDM were prepared and are shown in Table 7.

TABLE 7

Formulations of Precursor Compositions

| Ingredient | EPDM Composition L Amount (parts by weight) | EPDM Composition P Amount (parts by weight) |
|---|---|---|
| KELTAN ® 2650 EPDM | 65.8 | 0.0 |
| NORDEL ® IP 4520 EPDM | 0.0 | 65.8 |
| CHLOREZ ® 700 | 15.0 | 15.0 |
| AGERITE ® Resin D | 0.5 | 0.5 |
| INDUSTRENE ® B | 0.5 | 0.5 |
| WINGTACK ® 95 | 4.0 | 4.0 |
| Expandable Graphite 1722HT | 3.0 | 3.0 |
| GRAPHISTRENGTH ® EPDM 20ᵃ | 41.2 | 41.2 |
| TWARON ® pulp type 1099 | 11.0 | 11.0 |
| MAGSHIELD ® S | 3.0 | 3.0 |
| RICON ® 150 | 2.0 | 5.0 |
| Dicumyl peroxide | 1.75 | 1.75 |

ᵃA dispersion of multi-walled carbon nanotubes in 20% EPDM

Example 2

Mechanical, Physical, and Thermal Properties

The mechanical, physical, and thermal properties of the precursor compositions described in Table 1 were determined and are shown in Table 8. The mechanical, physical, and thermal properties were determined by conventional techniques. The properties of EPDM Compositions A-C were compared to two conventional, aramid-filled EPDM compositions, which are indicated in Table 8 as "EPDM Comparative Composition D" and "EPDM Comparative Composition E." The EPDM Comparative Compositions D and E included a larger number of ingredients than the EPDM Compositions A-C.

TABLE 8

Mechanical, Physical, and Thermal Properties of Precursor Compositions of Table 1

| Property | EPDM Composition A | EPDM Composition B | EPDM Composition C | EPDM Comparative Composition D | EPDM Comparative Composition E |
|---|---|---|---|---|---|
| Number of Ingredients | 12 | 11 | 13 | 16 | 18 |
| Specific Gravity (g/ml) | 1.07 | 1.05 | 1.04 | 1-1.04 | 1.18-1.22 |
| Mooney Viscosity at 212° F. | 52.3 | 39 | 50 | 20-50 | 60-90 |
| Tack Time (sec) | 0 | 0 | 11 | 0 | 0 |
| ESD Surface Resistivity (ohms/sq) | $2.17 \times 10^6$ | Insulator | $3.0 \times 10^7$ | Insulator | Insulator |
| ESD Volume Resistivity (ohms · cm) | $3.92 \times 10^7$ | Insulator | $4.05 \times 10^6$ | Insulator | Insulator |
| Modulus (psi) | 24300 | 13800 | 10877 | 4190 | 8460 |
| Stress Capability (psi) | 986 | 1200 | 1660 | 1440 | 2240 |
| Strain (%) | 32 | 34 | 29.4 | 36.3 | 29.1 |
| Propellant Compatibility | Compatible | Compatible | Compatible | Compatible | Compatible |

TABLE 8-continued

| | EPDM Composition A | EPDM Composition B | EPDM Composition C | EPDM Comparative Composition D | EPDM Comparative Composition E |
|---|---|---|---|---|---|
| Property | | | | | |
| Permeability at 20% Strain | Non-permeable | Non-permeable | Non-permeable | Non-permeable | Non-permeable |
| Coefficient of Thermal Expansion (in/in OF ×10⁻⁶) | 0 to 489 | −9 to +530 | +20 to +375 | −0.25 to +405 | +15 to +420 |
| Thermal Diffusivity (in²/sec) | 0.00025 | 0.00021 | 0.00021 | 0.00014 | 0.00018 |
| Specific Heat | 1.840 | 1.971 | 1.957 | 1.830 | 1.446 |
| ESD | ESD | Insulating | ESD | Insulating | Insulating |

Mechanical, Physical, and Thermal Properties of Precursor Compositions of Table 1

EPDM Compositions A-C exhibited comparable or improved modulus, stress capability, and strain capability compared to the EPDM Comparative Compositions D and E. Each of the EPDM Compositions A-C was also compatible with conventional propellants including, but not limited to, NEPE, PBAN, and HTPB. The EPDM Compositions A-C were also determined to be non-permeable to gases produced as volatile, combustion products during use of the precursor composition as insulation. EPDM Compositions A and C also exhibited comparable or improved ESD properties compared to EPDM Comparative Compositions D and E.

The mechanical, physical, and thermal properties of the precursor compositions described in Table 2 were determined and are shown in Table 9. The mechanical, physical, and thermal properties were determined by conventional techniques.

TABLE 9

Mechanical, Physical, and Thermal Properties of Precursor Compositions of Table 2

| Property | EPDM Comp. F | EPDM Comp. G | EPDM Comp. H | EPDM Comp. I | EPDM Comp. J | EPDM Comp. K |
|---|---|---|---|---|---|---|
| Specific Gravity (g/ml) | 1.033 | 1.029 | 1.025 | 1.033 | 1.029 | 1.025 |
| Tack Time (sec) | 16 | 25 | 31 | 29 | 32 | 29 |
| Strain at Max Stress (%) | 29.7 | 40.6 | 44.9 | 30.5 | 35.8 | 38.8 |
| Tensile Strength (psi) | 1080 | 802 | 741 | 975 | 786 | 798 |
| Torch data | 0.98 | 0.98 | 1.03 | 0.99 | 1.06 | 1.01 |

Each of EPDM Compositions F-K exhibited desirable properties.

The mechanical, physical, and thermal properties of the precursor compositions described in Table 3 were determined and are shown in Table 10. The mechanical, physical, and thermal properties were determined by conventional techniques.

TABLE 10

Mechanical, Physical, and Thermal Properties of Precursor Compositions of Table 3

| Property | EPDM Composition G | EPDM Composition Q | EPDM Composition R |
|---|---|---|---|
| Specific Gravity (g/cc) | 1.029 | 1.031 | 1.036 |
| Tack Time (sec) | 25 | 34 | 32 |
| Strain at Max Stress (%) | 40.6 | 32.5 | 40.2 |
| Tensile Strength (psi) | 802 | 970 | 865 |
| Torch data | 0.98 | 1.07 | 1.06 |

Each of EPDM Compositions G, Q, and R exhibited desirable properties.

The mechanical, physical, and thermal properties of the precursor compositions described in Table 4 were determined and are shown in Table 11. The mechanical, physical, and thermal properties were determined by conventional techniques.

TABLE 11

Mechanical, Physical, and Thermal Properties of Precursor Compositions of Table 4

| Property | EPDM Composition Q | EPDM Composition S | EPDM Composition T |
|---|---|---|---|
| Specific Gravity (g/cc) | 1.031 | 1.032 | 1.032 |
| Tack Time (sec) | 34 | 31 | 33 |
| Strain at Max Stress (%) | 32.5 | 36.1 | 37.3 |
| Tensile Strength (psi) | 970 | 892 | 861 |
| Torch data | 1.07 | 1.06 | 1.06 |

Each of EPDM Compositions Q, S, and T exhibited desirable properties.

The mechanical, physical, and thermal properties of the precursor compositions described in Table 5 were determined and are shown in Table 12. The mechanical, physical, and thermal properties were determined by conventional techniques.

TABLE 12

| | Mechanical, Physical, and Thermal Properties of Precursor Compositions of Table 5 | |
|---|---|---|
| Property | EPDM Composition L | EPDM Composition M |
| Specific Gravity (g/cc) | 1.014 | 1.007 |
| Tack Time (sec) | 44 | 37 |
| Strain at Max Stress (%) | 43.2 | 42.8 |
| Tensile Strength (psi) | 865 | 902 |
| Torch data | 0.995 | 1.034 |

Each of EPDM Compositions L and M exhibited desirable properties.

The mechanical, physical, and thermal properties of the precursor compositions described in Table 6 were determined and are shown in Table 13. The mechanical, physical, and thermal properties were determined by conventional techniques.

TABLE 13

| | Mechanical, Physical, and Thermal Properties of Precursor Compositions of Table 6 | | |
|---|---|---|---|
| Property | EPDM Composition N | EPDM Composition L | EPDM Composition O |
| Specific Gravity (g/cc) | 1.016 | 1.014 | 1.009 |
| Tack Time (sec) | 37 | 44 | 29 |
| Strain at Max Stress (%) | 52.5 | 43.2 | 37.2 |
| Tensile Strength (psi) | 818 | 865 | 883 |
| Torch data | 1.064 | 0.995 | 1.010 |

Each of EPDM Compositions N, L, and O exhibited desirable properties.

The mechanical, physical, and thermal properties of the precursor compositions described in Table 7 were determined and are shown in Table 14. The mechanical, physical, and thermal properties were determined by conventional techniques.

TABLE 14

| | Mechanical, Physical, and Thermal Properties of Precursor Compositions of Table 7 | |
|---|---|---|
| Property | EPDM Composition L | EPDM Composition P |
| Specific Gravity (g/cc) | 1.014 | 1.015 |
| Tack Time (sec) | 44 | 48.3 |
| Strain at Max Stress (%) | 43.2 | 30.9 |
| Tensile Strength (psi) | 865 | 800 |
| Torch data | 0.995 | 1.123 |

Each of EPDM Compositions L and P exhibited desirable properties.

Example 3

Flow and Extrudability Properties

The rubber flow behavior of EPDM Compositions A-C described in Table 1 was determined by conventional techniques. The precursor compositions were placed in a spider mold and cured. Each of EPDM Compositions A-C, respectively, exhibited good rubber flow characteristics in the spider mold, as shown in FIGS. 3-5.

The extrusion ability of EPDM Compositions A-C described in Table 1 was determined by conventional techniques. As shown in FIGS. 6-8, each of EPDM Compositions A-C, respectively, exhibited good extrudability.

Example 4

Ablative Properties

The ablative properties of EPDM Compositions A-C described in Table 1 were determined in a low Mach seventy pound char (SPC) motor test. The SPC motor test simulated conventional temperature and pressure conditions in low velocity, mid velocity, and high velocity sections of the char motor. The diameter of the char motor varies in these three sections, with the char motor having a relatively large diameter in the low velocity section while in the high velocity section, the char motor has a relatively small diameter. The diameter of the char motor at a given location determines the amount of exposure that the insulation receives. If the diameter is small, that section of the char motor will be exposed to more gases and will be more prone to erosion than if the diameter is large. Therefore, a particular portion of the char motor in the low velocity section is exposed to a reduced amount of gases in comparison to a particular portion of the char motor in the high velocity section.

Each of EPDM Compositions A-C was formed into a thin sheet, cured, and assembled into the char motor by conventional techniques. The thickness of the insulation was measured at selected intervals, nominally one inch apart, before firing the char motor. The weight of the part was also recorded before firing the char motor. After firing, the char motor was disassembled, and the thickness and weight of the insulation were measured again. The rate at which each of the insulations is reduced or eroded is expressed in terms of the reduction of the thickness of the insulation per second, and is referred to as the material affected rate or material ablation rate ("MAR"). The MAR of the insulations was determined by subtracting the post-fired thickness of virgin insulation (i.e., after the char had been removed) at a given point from the pre-fired thickness at the same point and dividing the result by the burn time of the char motor. The MAR and percent weight loss are indicators of damage (e.g., ablation) to the insulation, where lower numbers indicate better insulative and ablative performance.

Figure 9:
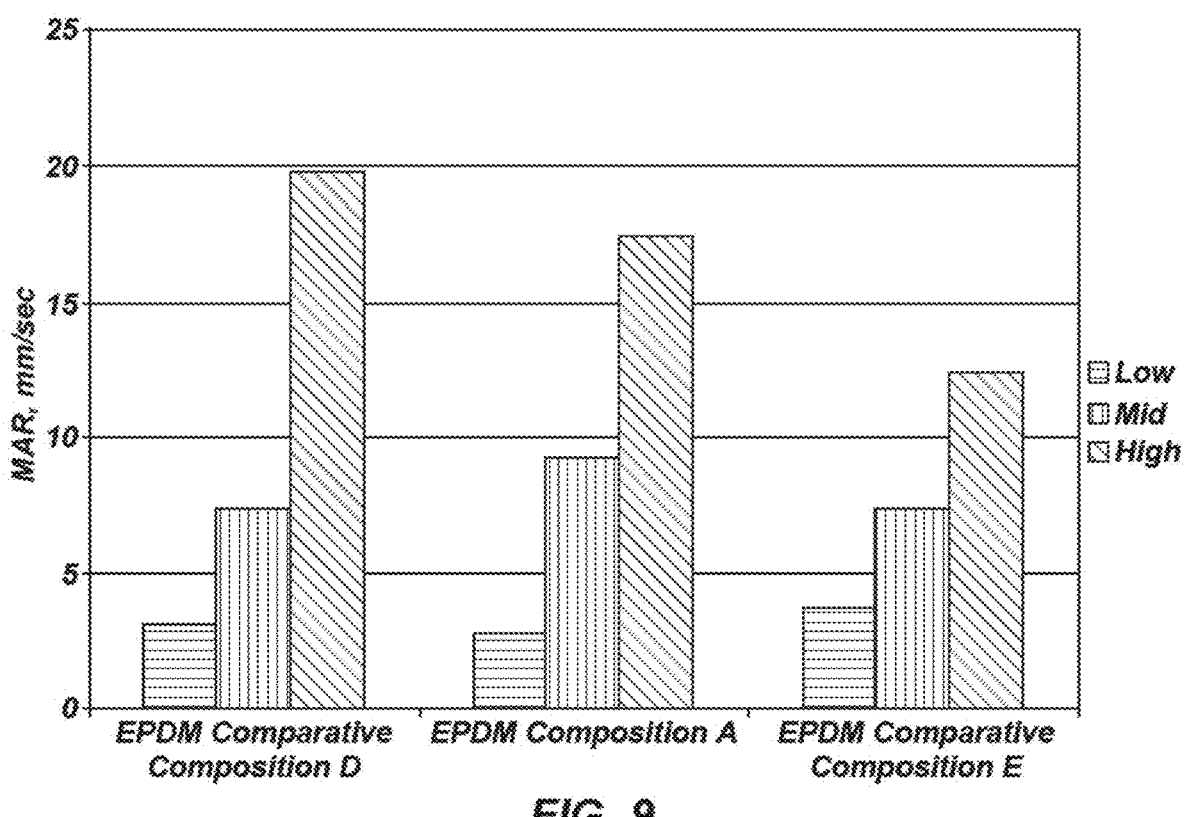
FIGS. 9-11 are bar graphs of the material ablation rate (mm/s) versus chamber location (inches) of the insulation formed from the precursor compositions according to embodiments of the disclosure from the low, mid, and high sections of the SPC motor test.
Figure 10:
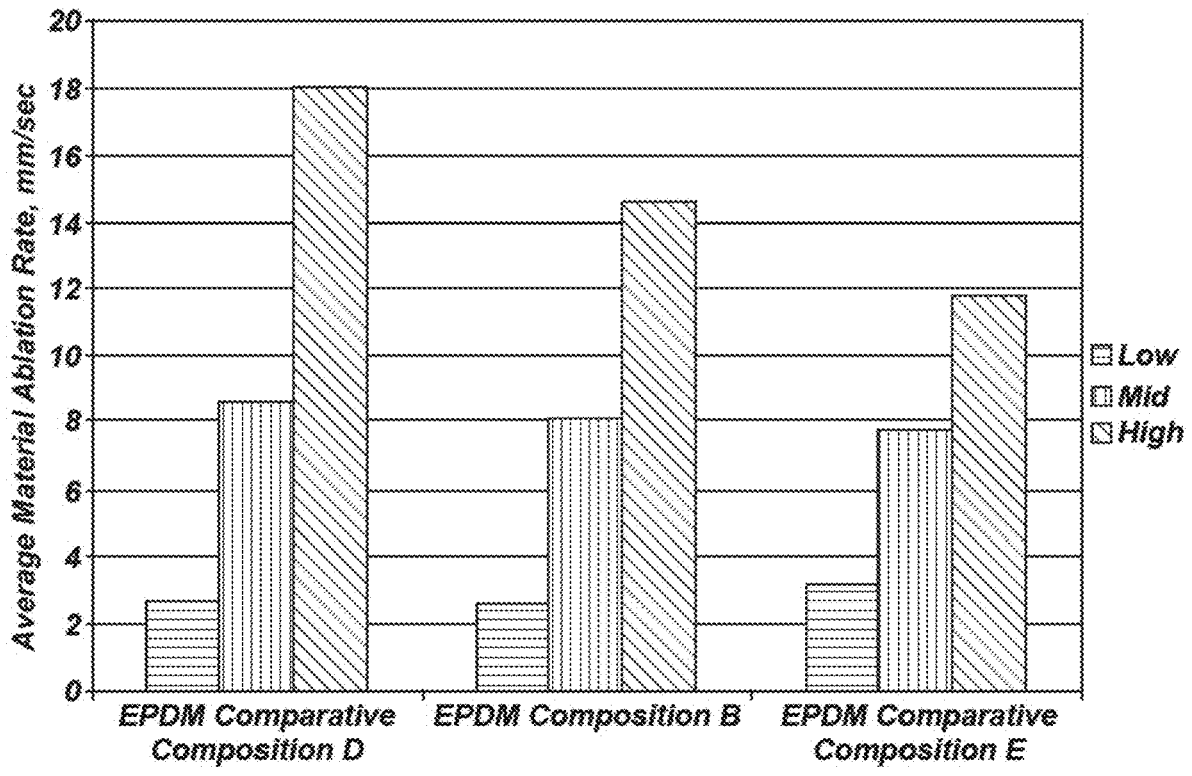
Figure 11:
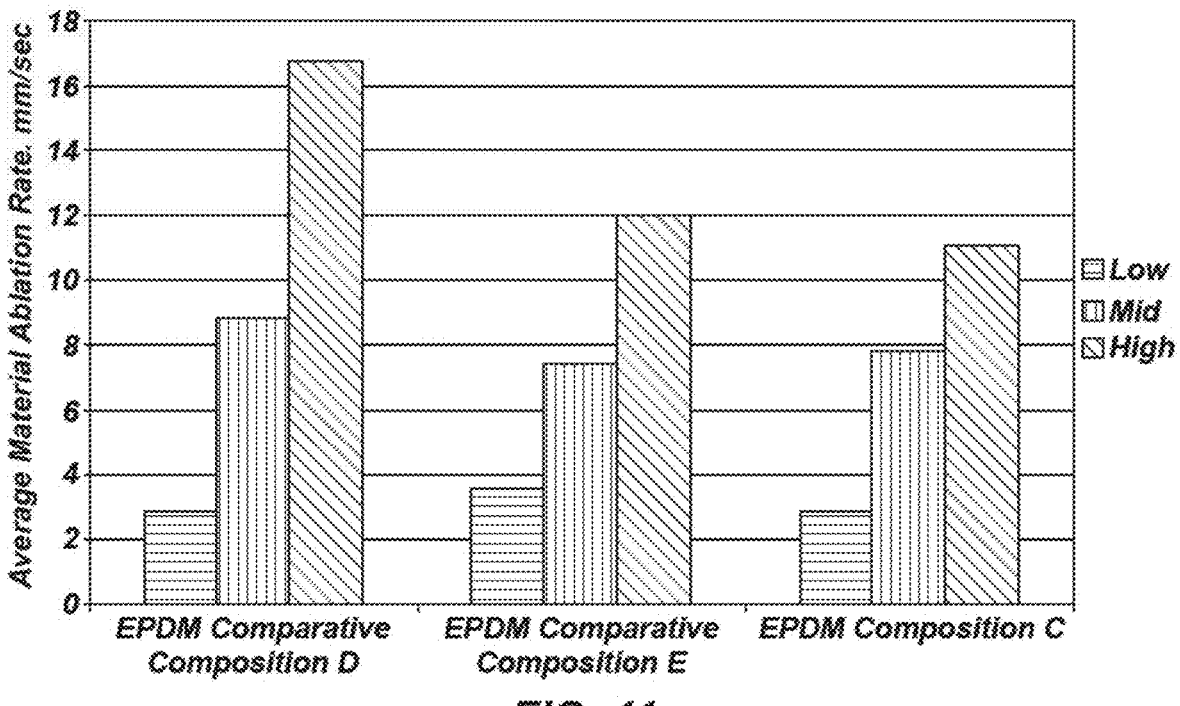

The MAR was measured for the low velocity, mid velocity, and high velocity sections of the char motor and is shown in FIGS. 9-11 for EPDM Compositions A-C, respectively, along with the MAR for EPDM Comparative Compositions D and E.

Figure 12:
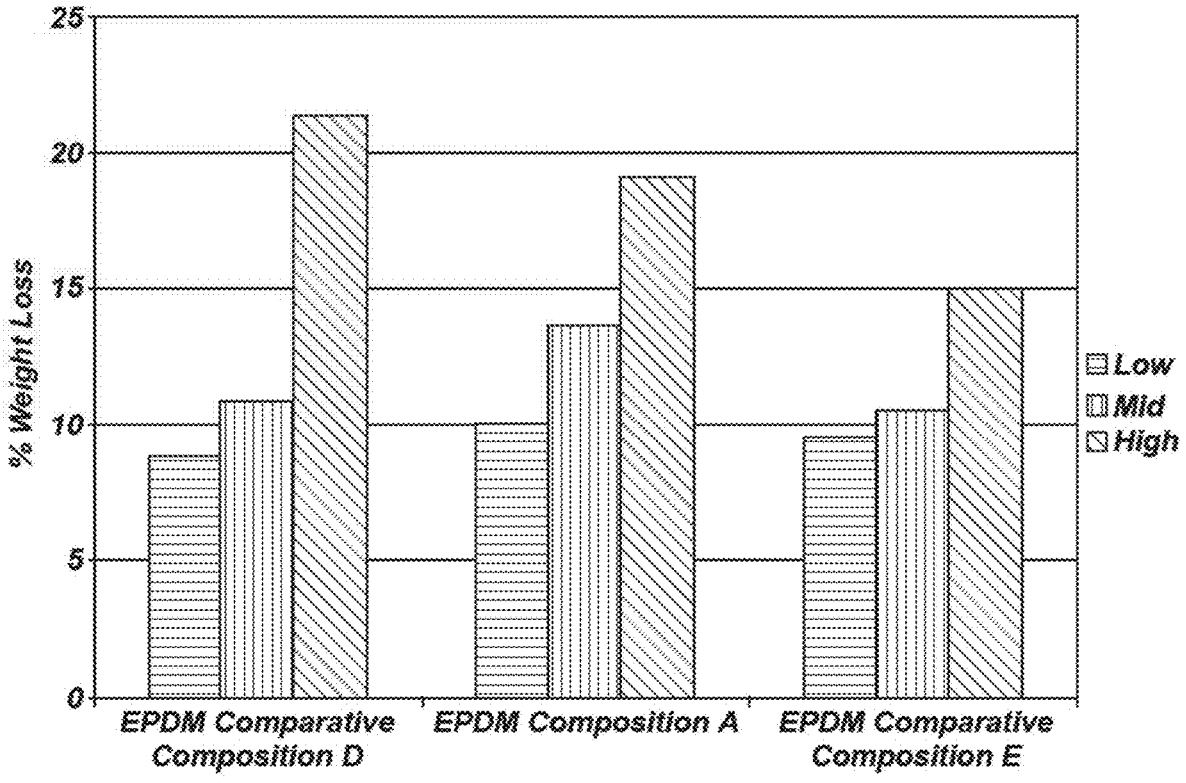
FIGS. 12-14 are bar graphs showing weight loss (percent weight loss) from a seventy pound char (SPC) motor test of low, mid, and high sections of the char motor having insulation formed from the precursor compositions according to embodiments of the disclosure.
Figure 13:
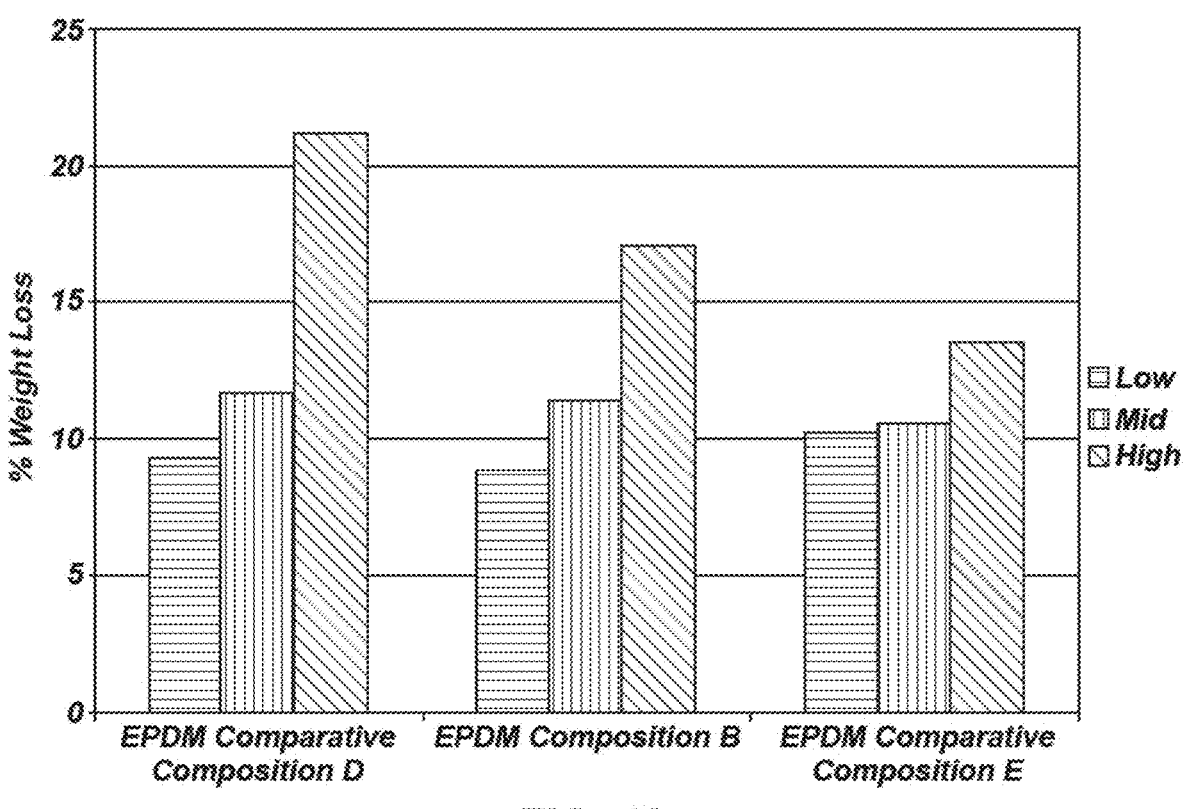
Figure 14:
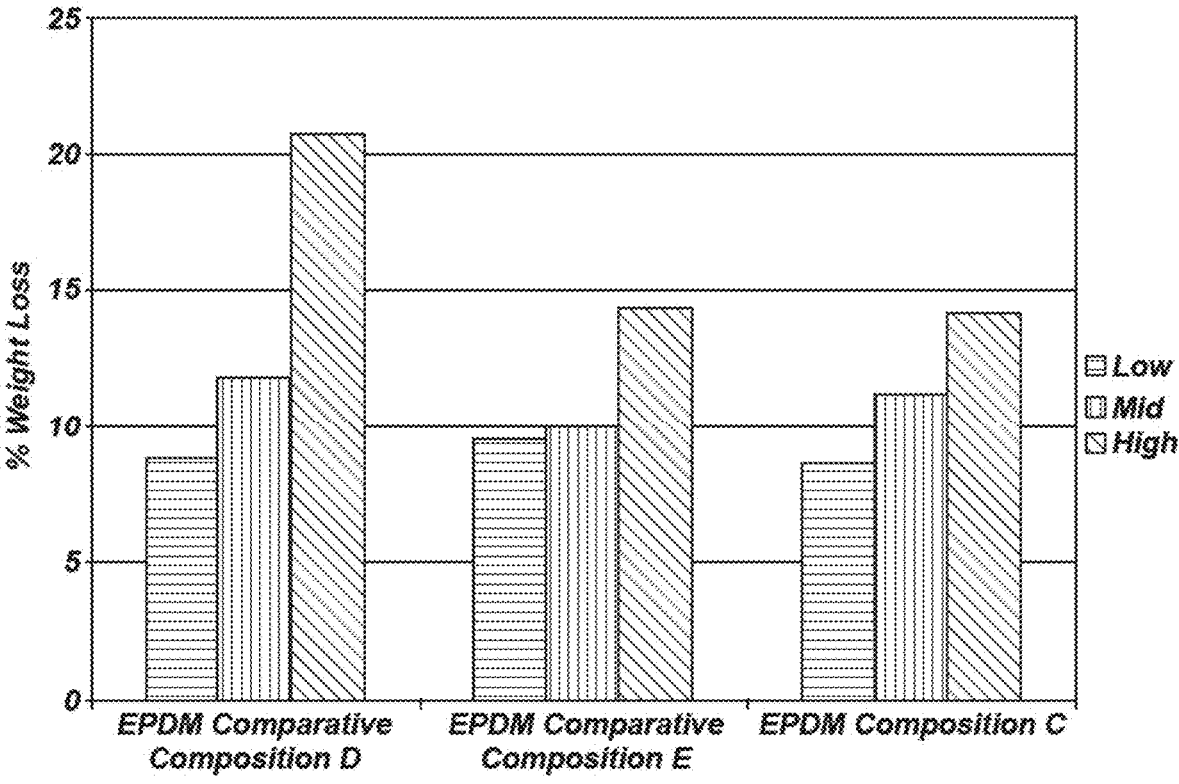

The percent weight loss of the insulations was determined as a function of the pre-fired weight for the low velocity, mid velocity, and high velocity sections of the char motor and is shown in FIGS. 12-14 for EPDM Compositions A-C, respectively, along with the percent weight loss for EPDM Comparative Compositions D and E.

Figure 15:
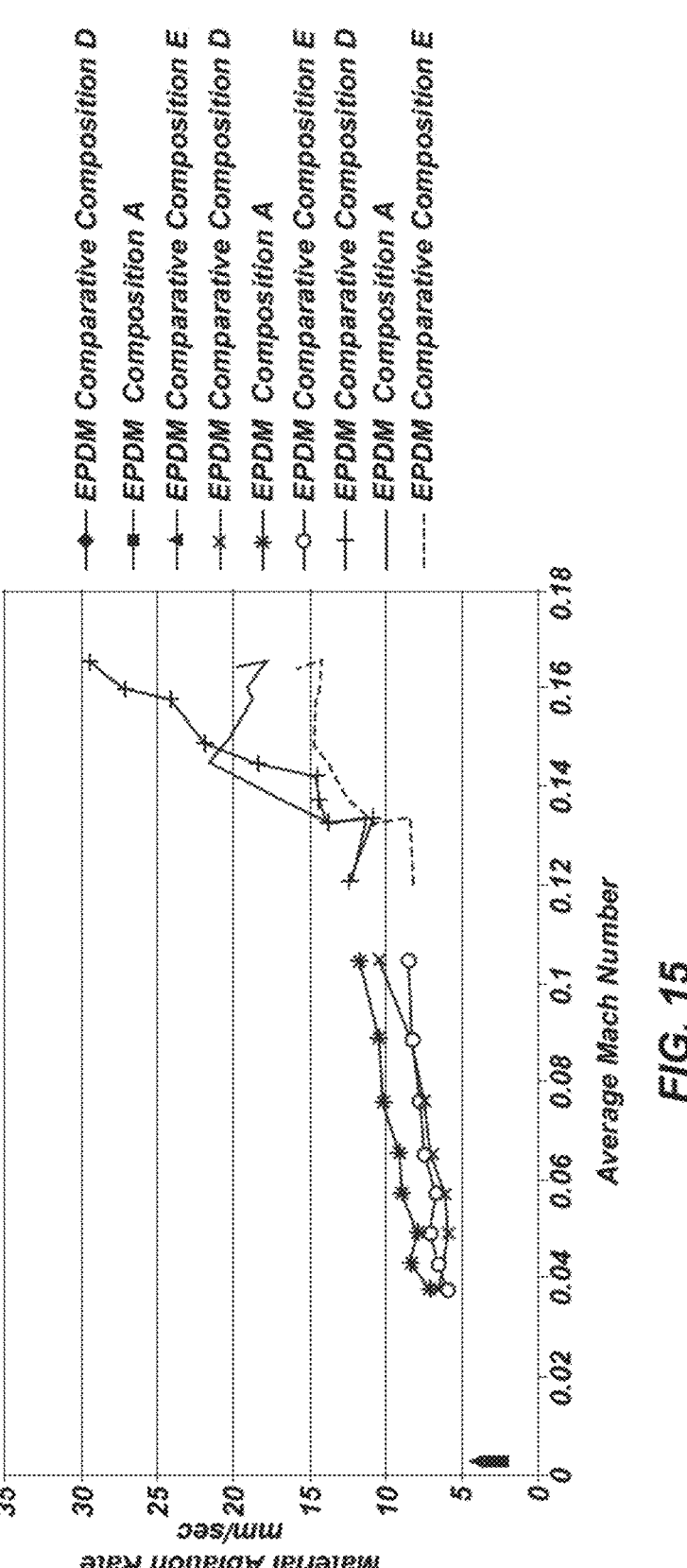
FIGS. 15-17 are plots showing the average material ablation rate (mm/s) of the insulation formed from the precursor compositions according to embodiments of the disclosure from the low, mid, and high sections of the SPC motor test.
Figure 16:
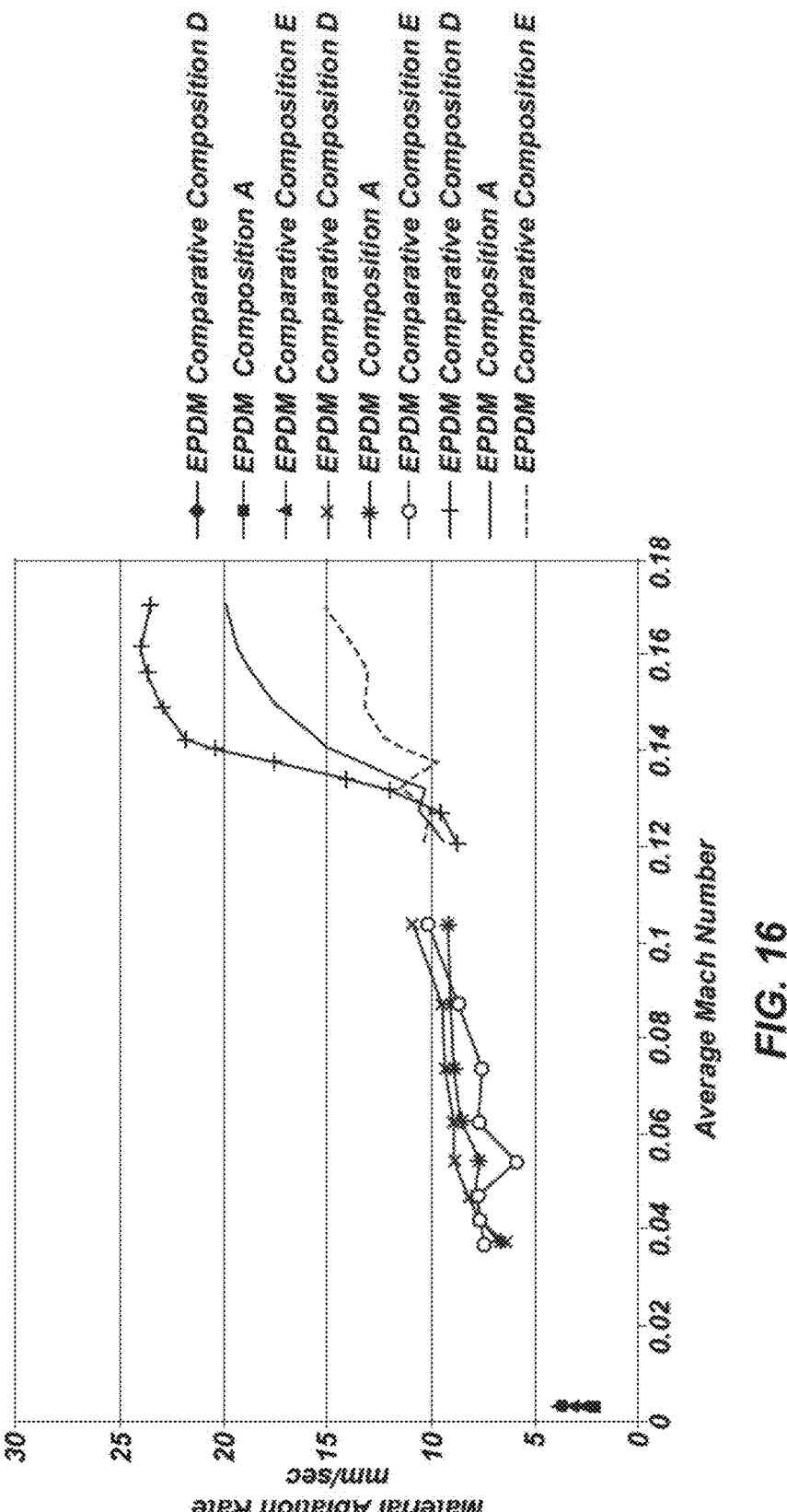
Figure 17:
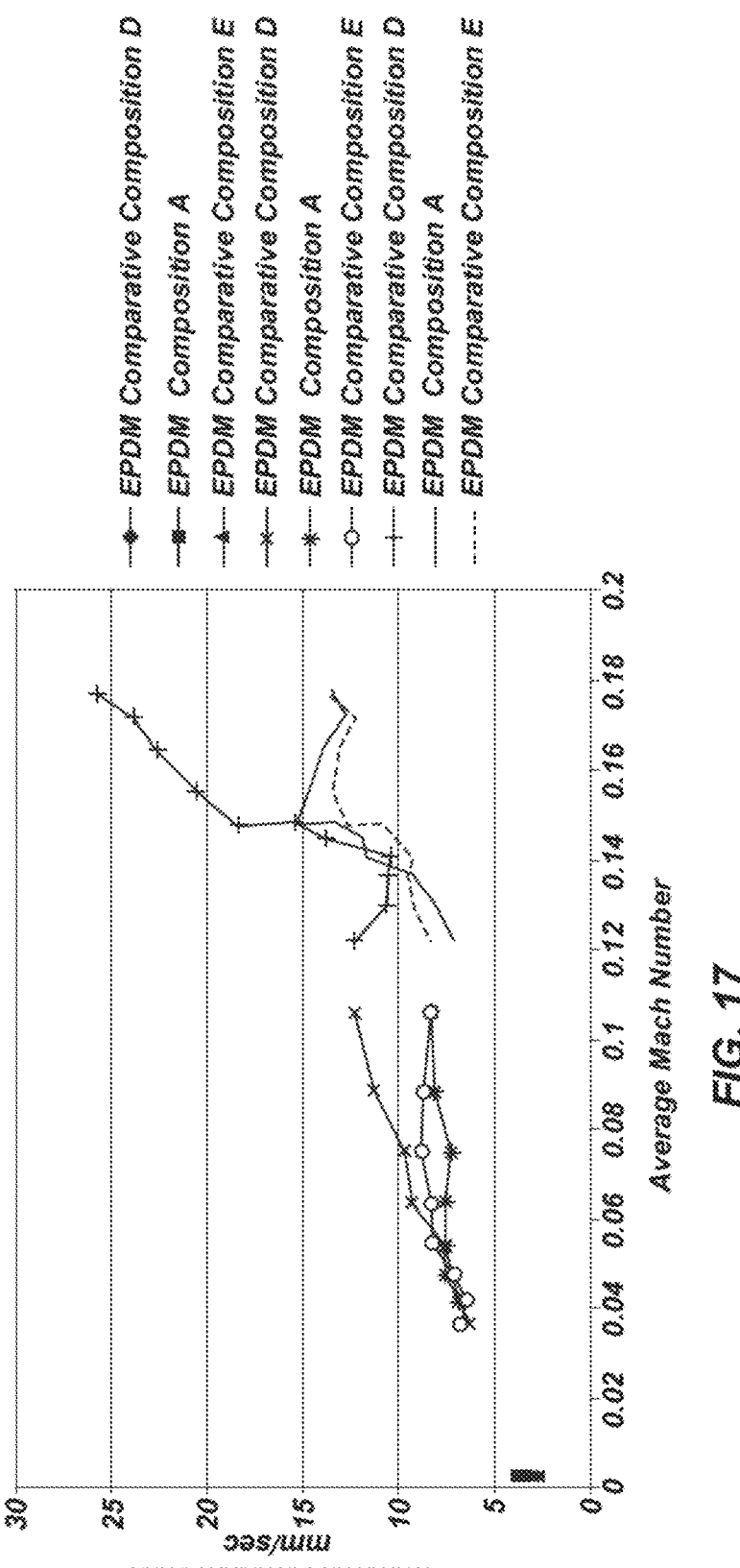

The average MAR for the insulations formed from the precursor compositions described in Example 1 was measured for the low velocity, mid velocity, and high velocity sections of the char motor and is shown in FIGS. 15-17 for EPDM Compositions A-C, respectively, along with the MAR for EPDM Comparative Compositions D and E.

Each of EPDM Compositions A-C exhibited comparable or improved ablative performance compared to the conventional, aramid-filled EPDM compositions (EPDM Comparative Compositions D and E).

While the disclosure may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the scope of the following appended claims and their legal equivalents.

What is claimed is:

1. A precursor composition, consisting of, before curing:
ethylene propylene diene monomer (EPDM);
an aramid;
multi-walled carbon nanotubes in an amount of from about 15.0 parts by weight to about 30.0 parts by weight of the precursor composition;
expandable graphite in an amount of from about 1.0 parts by weight to about 10.0 parts by weight of the precursor composition;
a plasticizer;
one or more of zinc oxide, silica, or magnesium hydroxide;
a chlorinated organic compound;
trimethylolpropane trimethacrylate or a poly(butadiene) resin;
an antioxidant;
a fatty acid; and
a peroxide,
wherein after curing, the precursor composition provides an insulation material exhibiting an ablative performance suitable for use in various regions of a rocket motor.

2. The precursor composition of claim 1, wherein the plasticizer is an aliphatic resin.

3. The precursor composition of claim 1, wherein the plasticizer is a five carbon petroleum hydrocarbon.

4. The precursor composition of claim 1, wherein the chlorinated organic compound is a solid chlorinated paraffin.

5. The precursor composition of claim 1, wherein the antioxidant is a hydroquinoline compound, an amine compound, a phenol compound, or a combination thereof.

6. The precursor composition of claim 1, wherein the antioxidant is a polymerized 1,2 dihydro-2,2,4-trimethylquinoline.

7. The precursor composition of claim 1, wherein the fatty acid is stearic acid.

8. The precursor composition of claim 1, wherein the peroxide is 1,1-di-(t-butylperoxy)-3,3,5-trimethylcyclohexane or dicumyl peroxide.

9. A precursor composition, comprising, before curing:
ethylene propylene diene monomer (EPDM);
poly-p-phenylene terephthalamide;
multi-walled carbon nanotubes in an amount of from about 15.0 parts by weight to about 30.0 parts by weight of the precursor composition;
expandable graphite in an amount of from about 1.0 parts by weight to about 10.0 parts by weight of the precursor composition;

a five carbon petroleum hydrocarbon;
magnesium hydroxide;
a solid chlorinated paraffin;
a poly(butadiene) resin;
a hydroquinoline compound;
a fatty acid; and
1,1-di-(t-butylperoxy)-3,3,5-trimethylcyclohexane or dicumyl peroxide,
wherein after curing, the precursor composition provides an insulation material exhibiting an ablative performance suitable for use in various regions of a rocket motor.

10. The precursor composition of claim 9, wherein the hydroquinoline compound is a polymerized 1,2 dihydro-2, 2,4-trimethylquinoline.

11. The precursor composition of claim 9, wherein the poly-p-phenylene terephthalamide is poly-p-phenylene terephthalamide fibers or poly-p-phenylene terephthalamide pulp.

12. A precursor composition, consisting of, before curing:
ethylene propylene diene monomer (EPDM);
poly-p-phenylene terephthalamide;
multi-walled carbon nanotubes in an amount of from about 15.0 parts by weight to about 30.0 parts by weight of the precursor composition;
expandable graphite in an amount of from about 1.0 parts by weight to about 10.0 parts by weight of the precursor composition;
a five carbon petroleum hydrocarbon;
magnesium hydroxide;
a solid chlorinated paraffin;
a poly(butadiene) resin;
a polymerized 1,2 dihydro-2,2,4-trimethylquinoline;
stearic acid; and
dicumyl peroxide,
wherein after curing, the precursor composition provides an insulation material exhibiting an ablative performance suitable for use in various regions of a rocket motor.

13. The precursor composition of claim 12, wherein the poly(butadiene) resin is a high vinyl poly(butadiene).

14. A precursor composition, consisting of, before curing:
ethylene propylene diene monomer (EPDM);
an aramid;
multi-walled carbon nanotubes in an amount of from about 15.0 parts by weight to about 30.0 by weight of the precursor composition;
expandable graphite in an amount of from about 1.0 parts by weight to about 10.0 parts by weight of the precursor composition;
a plasticizer;
one or more of zinc oxide, silica, or magnesium hydroxide;
a chlorinated organic compound;
a co-agent;
an antioxidant;
a fatty acid; and
a peroxide,
wherein after curing, the precursor composition provides an insulation material exhibiting an ablative performance suitable for use in various regions of a rocket motor.

* * * * *